United States Patent
Morimoto et al.

(10) Patent No.: US 7,833,673 B2
(45) Date of Patent: Nov. 16, 2010

(54) SOLID POLYMER ELECTROLYTIC FUEL CELL

(75) Inventors: Takashi Morimoto, Osaka (JP); Hiroki Kusakabe, Osaka (JP); Toshihiro Matsumoto, Osaka (JP); Norihiko Kawabata, Osaka (JP)

(73) Assignee: Panasonic Corporation, Osaka (JP)

( * ) Notice: Subject to any disclaimer, the term of this patent is extended or adjusted under 35 U.S.C. 154(b) by 81 days.

(21) Appl. No.: 12/092,158

(22) PCT Filed: Jun. 26, 2007

(86) PCT No.: PCT/JP2007/062775

§ 371 (c)(1),
(2), (4) Date: Apr. 30, 2008

(87) PCT Pub. No.: WO2008/001755

PCT Pub. Date: Jan. 3, 2008

(65) Prior Publication Data
US 2009/0286121 A1 Nov. 19, 2009

(30) Foreign Application Priority Data
Jun. 26, 2006 (JP) .............................. 2006-174929

(51) Int. Cl.
*H01M 2/08* (2006.01)
(52) U.S. Cl. .................... 429/463; 429/465; 429/469
(58) Field of Classification Search .................. 429/35, 429/463
See application file for complete search history.

(56) References Cited

U.S. PATENT DOCUMENTS

| | | | | |
|---|---|---|---|---|
| 2001/0019790 A1* | 9/2001 | Regan et al. | ................... | 429/35 |
| 2001/0051294 A1* | 12/2001 | Inoue et al. | ................... | 429/35 |
| 2003/0049518 A1* | 3/2003 | Nanaumi et al. | ............... | 429/44 |
| 2004/0234831 A1* | 11/2004 | Kobayashi et al. | ............ | 429/30 |
| 2005/0084734 A1 | 4/2005 | Kobayashi et al. | | |
| 2006/0083977 A1* | 4/2006 | Nagoshi et al. | ................ | 429/35 |
| 2007/0072045 A1 | 3/2007 | Haufe et al. | | |

(Continued)

FOREIGN PATENT DOCUMENTS

DE    10 2004 028 141    1/2006

(Continued)

OTHER PUBLICATIONS

Translation of the International Preliminary Report on Patentability issued Feb. 3, 2009 in the International (PCT) Application of which the present application is the U.S. National Stage.

(Continued)

*Primary Examiner*—Dah-Wei D Yuan
*Assistant Examiner*—Jacob Marks
(74) *Attorney, Agent, or Firm*—Wenderoth, Lind & Ponack, L.L.P.

(57) ABSTRACT

Elastic members that are integrally joined to a frame member are placed between an outer edge of an electrode unit and an inner edge of the frame member, and in the assembled state of the single cell module, the elastic members are elastically deformed in the thickness direction of a membrane-electrode-frame assembly so that the gap between the membrane-electrode-frame assembly and the separator is sealed in a tight contact state.

20 Claims, 29 Drawing Sheets

U.S. PATENT DOCUMENTS

2007/0264557 A1* 11/2007 Kobayashi et al. ............ 429/36

FOREIGN PATENT DOCUMENTS

| JP | 6-325777 | 11/1994 |
| --- | --- | --- |
| JP | 8-045517 | 2/1996 |
| JP | 2001-351651 | 12/2001 |
| JP | 2002-042838 | 2/2002 |
| JP | 2004-319461 | 11/2004 |
| JP | 2005-100970 | 4/2005 |
| JP | 2006-310288 | 11/2006 |
| WO | 2006/040994 | 4/2006 |
| WO | WO 2006-040994 * | 4/2006 |
| WO | 2006/106908 | 10/2006 |

OTHER PUBLICATIONS

Translation of the Written Opinion (PCT/ISA/237) issued Feb. 3, 2009 in the International (PCT) Application of which the present application is the U.S. National Stage.

International Search Report issued Oct. 16, 2007 in the International (PCT) Application of which the present application is the U.S. National Stage.

* cited by examiner

SOLID POLYMER ELECTROLYTIC FUEL CELL

TECHNICAL FIELD

The present invention relates to a solid polymer electrolytic fuel cell, and more particularly to an improved sealing structure for a fuel cell between an electrolyte membrane-electrode assembly and a conductive separator.

BACKGROUND ART

The most typical solid polymer electrolytic fuel cell is configured by a polymer electrolyte membrane supported by a frame member having a gasket for sealing gas placed on its peripheral portion, an electrolyte membrane-electrode assembly (MEA) formed by an anode joined to one of the surfaces of the electrolyte membrane and a cathode joined to the other surface of the electrolyte membrane, and an anode-side conductive separator plate and a cathode-side conductive separator plate that sandwich the MEA, and a gas supply unit for supplying a fuel gas and an oxidizing agent gas to the anode and the cathode, respectively, is formed on a peripheral edge of the center portion in the separator plate, which is placed in contact with the MEA.

However, as shown in FIG. 12, since this conventional solid polymer electrolytic fuel cell has a gap 303 between the inner edge of a frame member 300 and an electrode 302, which is required upon assembling the frame member 300 and the separator 301, a phenomenon referred to as a cross-leak, in which a part of gas supplied into the fuel cell is discharged through this gap 303, tends to occur.

In order to prevent this phenomenon, as shown in FIG. 13, a structure has been proposed in which a second gasket 308 is placed in this gap 303 (Patent Document 1), and a method (Patent Document 2) has been proposed in which one portion of an inner edge of a gasket and an outer edge of an electrode 302 are disposed so as to be partially placed in contact with each other.

Moreover, the polymer electrolyte membrane is assembled virtually in the center of the thickness of the frame member, and with respect to its joining method, methods such as thermal compression bonding, bonding agent, and mechanical cramping, have been adopted.

Patent Document 1: Japanese Patent Application No. 2004-296702 (published as WO 2006/040994 A1)

Patent Document 2: Japanese Unexamined Patent Publication No. 2005-100970

DISCLOSURE OF INVENTION

Subject to be Solved by the Invention

However, the above-mentioned joining methods for the polymer electrolyte membrane by the use of thermal compression bonding or a bonding agent tend to cause degradation in the performance of the polymer electrolyte membrane due to heat and volatile components of the bonding agent, and the application conditions are consequently limited. Moreover, the joining method by the use of mechanical cramping causes an issue in that cross-leak easily occurs through a fine gap between the polymer electrolyte membrane and the frame member.

The method of the above-mentioned Patent Document 1, which needs to install a second gasket 308 for eliminating the gap 303 between the inner edge of the frame member 300 and the electrode 302, has an issue of high costs. Moreover, another issue is that, when this gasket 308 is partially fused to fill the gap, it becomes difficult to properly control the dimension.

The method of the above-mentioned Patent Document 2 in which one portion of the inner edge of a gasket and the outer edge of the electrode 302 are partially placed in contact with each other fails to provide a sufficient effect, or since the gas diffusion electrode is mainly made from carbon fibers that are bristle in general, another issue is that upon assembling, the electrode tends to be damaged.

Therefore, the object of the present invention is to overcome the above-mentioned issues, that is, to provide a solid polymer electrolytic fuel cell which makes it possible to effectively restrain a cross-leak phenomenon that occurs through the gap between the polymer electrolyte membrane and the frame member, and also to improve the rates of utilization of a reducing agent gas and an oxidizing agent gas respectively, as well as further enhancing the performance of a polymer electrolyte fuel cell.

Means for Solving the Subject

In order to achieve the above-mentioned objects, the present invention is provided with the following arrangements.

According to a first aspect of the present invention, there is provided a solid polymer electrolytic fuel cell, which is a polymer electrolytic fuel cell configured by laminating single cell modules, each comprising:

a membrane-electrode-frame assembly having an electrode unit configured by an anode electrode joined onto one of surfaces of a polymer electrolyte membrane and a cathode electrode joined onto the other surface of the electrolyte membrane and a manifold-forming frame member that is placed on a peripheral edge of the electrode unit and provided with a gas supply unit for supplying a fuel gas and an oxidizing agent gas respectively to the anode electrode and the cathode electrode; and a pair of separators sandwiching the electrode unit and the membrane-electrode-frame assembly from an anode side as well as from a cathode side, wherein an elastic member is placed between an outer edge of the electrode unit and an inner edge of the frame member, and the elastic member is integrally joined to the frame member and has a length equal to or longer than a gap dimension between the membrane-electrode-frame assembly and the separator in an assembled state of the single cell modules, with the elastic member being elastically deformed in a thickness direction of the membrane-electrode-frame assembly in the assembled state of the single cell modules, so that the gap between the membrane-electrode-frame assembly and the separator is sealed in a tight contact state.

According to a second aspect of the present invention, there is provided the solid polymer electrolytic fuel cell according to the first aspect, wherein the elastic member is provided with a plurality of short-cut preventing ribs that are placed in contact with the separator to be elastically deformed so that, in the assembled state of the single cell modules, the ribs are elastically deformed in a direction orthogonal to the thickness direction of the membrane-electrode-frame assembly.

According to a third aspect of the present invention, there is provided the solid polymer electrolytic fuel cell according to the second aspect, wherein a concave section into which elastically deformed portions of the ribs and an elastically deformed portion of the elastic member are released is placed between the ribs so that the elastically deformed portion of the elastic member and the elastically deformed portions of the ribs are extended into the concave section.

According to a fourth aspect of the present invention, there is provided the solid polymer electrolytic fuel cell according to the second aspect, wherein in a portion near the gas supply unit, the elastic member has a length less than the gap dimension between the membrane-electrode-frame assembly and the separator in the assembled state of the single cell modules so that a gas supplying space is formed between the elastic member and the separator.

According to a fifth aspect of the present invention, there is provided the solid polymer electrolytic fuel cell according to any one of the first to fourth aspects, wherein the elastic member is placed only on one of an anode side and a cathode side of the membrane-electrode-frame assembly, and an extended portion which is formed by extending the frame member toward a center in an inner edge direction so as to receive a compressing pressure of the elastic member upon laminating the separator, is prepared on the other side of the membrane-electrode-frame assembly.

According to a sixth aspect of the present invention, there is provided the solid polymer electrolytic fuel cell according to any one of the first to fourth aspects, wherein the elastic member is placed on each of an anode side and a cathode side of the membrane-electrode-frame assembly, with a position of the elastic member on the anode side and a position of the elastic member on the cathode side being shifted from each other.

According to a seventh aspect of the present invention, there is provided the solid polymer electrolytic fuel cell according to the fifth aspect, wherein the elastic member is placed on each of the anode side and the cathode side of the membrane-electrode-frame assembly, with a position of the elastic member on the anode side and a position of the elastic member on the cathode side being shifted from each other.

According to an eighth aspect of the present invention, there is provided the solid polymer electrolytic fuel cell according to the sixth aspect, wherein a position of an outer edge of the anode electrode joined to one of the surfaces of the polymer electrolyte membrane and a position of an outer edge of the cathode electrode joined to the other surface of the polymer electrolyte membrane are placed with a shift from each other so that the positions of the elastic member on the anode side and the elastic member on the cathode side are shifted from each other.

According to a ninth aspect of the present invention, there is provided the solid polymer electrolytic fuel cell according to the seventh aspect, wherein a position of an outer edge of the anode electrode joined to one of the surfaces of the polymer electrolyte membrane and a position of an outer edge of the cathode electrode joined to the other surface of the polymer electrolyte membrane are placed with a shift from each other so that the positions of the elastic member on the anode side and the elastic member on the cathode side are shifted from each other.

According to a 10th aspect of the present invention, there is provided the solid polymer electrolytic fuel cell according to any one of the first to fourth aspects, wherein the frame member is provided with a gasket, formed on a frame member assembled surface corresponding to a surface on a side where the cathode electrode is positioned so as to protrude therefrom, which includes a manifold hole for an oxidizing agent gas and an oxidizing agent gas flow passage and surrounds an entire area of the cathode electrode through which the oxidizing agent gas is allowed to pass so that a manifold for an oxidizing gas is formed, and another gasket, formed on another frame member assembled surface corresponding to a surface of the frame member on a side where the anode electrode is positioned so as to protrude therefrom, which includes a manifold hole for a fuel gas and a fuel gas flow passage and surrounds an entire area of the anode electrode through which the fuel gas is allowed to pass so that a manifold for a fuel gas is formed, and in the assembled state of the single cell module, the gaskets are elastically deformed respectively in the thickness direction of the frame member so that the gap between the frame member and the separator is sealed in a tight contact state.

According to an 11th aspect of the present invention, there is provided the solid polymer electrolytic fuel cell according to the fifth aspect, wherein the frame member is provided with a gasket, formed on a frame member assembled surface corresponding to a surface on a side where the cathode electrode is positioned so as to protrude therefrom, which includes a manifold hole for an oxidizing agent gas and an oxidizing agent gas flow passage and surrounds an entire area of the cathode electrode through which the oxidizing agent gas is allowed to pass so that a manifold for an oxidizing gas is formed, and another gasket, formed on another frame member assembled surface corresponding to a surface of the frame member on a side where the anode electrode is positioned so as to protrude therefrom, which includes a manifold hole for a fuel gas and a fuel gas flow passage and surrounds an entire area of the anode electrode through which the fuel gas is allowed to pass so that a manifold for a fuel gas is formed, and in the assembled state of the single cell module, the gaskets are elastically deformed respectively in the thickness direction of the frame member so that the gap between the frame member and the separator is sealed in a tight contact state.

According to a 12th aspect of the present invention, there is provided the solid polymer electrolytic fuel cell according to the sixth aspect, wherein the frame member is provided with a gasket, formed on a frame member assembled surface corresponding to a surface on a side where the cathode electrode is positioned so as to protrude therefrom, which includes a manifold hole for an oxidizing agent gas and an oxidizing agent gas flow passage and surrounds an entire area of the cathode electrode through which the oxidizing agent gas is allowed to pass so that a manifold for an oxidizing gas is formed, and another gasket, formed on another frame member assembled surface corresponding to a surface of the frame member on a side where the anode electrode is positioned so as to protrude therefrom, which includes a manifold hole for a fuel gas and a fuel gas flow passage and surrounds an entire area of the anode electrode through which the fuel gas is allowed to pass so that a manifold for a fuel gas is formed, and in the assembled state of the single cell module, the gaskets are elastically deformed respectively in the thickness direction of the frame member so that the gap between the frame member and the separator is sealed in a tight contact state.

According to a 13th aspect of the present invention, there is provided the solid polymer electrolytic fuel cell according to the seventh aspect, wherein the frame member is provided with a gasket, formed on a frame member assembled surface corresponding to a surface on a side where the cathode electrode is positioned so as to protrude therefrom, which includes a manifold hole for an oxidizing agent gas and an oxidizing agent gas flow passage and surrounds an entire area of the cathode electrode through which the oxidizing agent gas is allowed to pass so that a manifold for an oxidizing gas is formed, and another gasket, formed on another frame member assembled surface corresponding to a surface of the frame member on a side where the anode electrode is positioned so as to protrude therefrom, which includes a manifold hole for a fuel gas and a fuel gas flow passage and surrounds an entire area of the anode electrode through which the fuel gas is allowed to pass so that a manifold for a fuel gas is formed, and in the assembled state of the single cell module, the gaskets are elastically deformed respectively in the thickness direction of the frame member so that the gap between the frame member and the separator is sealed in a tight contact state.

According to a 14th aspect of the present invention, there is provided the solid polymer electrolytic fuel cell according to the eighth aspect, wherein the frame member is provided with a gasket, formed on a frame member assembled surface corresponding to a surface on a side where the cathode electrode is positioned so as to protrude therefrom, which includes a manifold hole for an oxidizing agent gas and an oxidizing agent gas flow passage and surrounds an entire area of the cathode electrode through which the oxidizing agent gas is allowed to pass so that a manifold for an oxidizing gas is formed, and another gasket, formed on another frame member assembled surface corresponding to a surface of the frame member on a side where the anode electrode is positioned so as to protrude therefrom, which includes a manifold hole for a fuel gas and a fuel gas flow passage and surrounds an entire area of the anode electrode through which the fuel gas is allowed to pass so that a manifold for a fuel gas is formed, and in the assembled state of the single cell module, the gaskets are elastically deformed respectively in the thickness direction of the frame member so that the gap between the frame member and the separator is sealed in a tight contact state.

According to a 15th aspect of the present invention, there is provided the solid polymer electrolytic fuel cell according to the ninth aspect, wherein the frame member is provided with a gasket, formed on a frame member assembled surface corresponding to a surface on a side where the cathode electrode is positioned so as to protrude therefrom, which includes a manifold hole for an oxidizing agent gas and an oxidizing agent gas flow passage and surrounds an entire area of the cathode electrode through which the oxidizing agent gas is allowed to pass so that a manifold for an oxidizing gas is formed, and another gasket, formed on another frame member assembled surface corresponding to a surface of the frame member on a side where the anode electrode is positioned so as to protrude therefrom, which includes a manifold hole for a fuel gas and a fuel gas flow passage and surrounds an entire area of the anode electrode through which the fuel gas is allowed to pass so that a manifold for a fuel gas is formed, and in the assembled state of the single cell module, the gaskets are elastically deformed respectively in the thickness direction of the frame member so that the gap between the frame member and the separator is sealed in a tight contact state.

According to a 16th aspect of the present invention, there is provided a solid polymer electrolytic fuel cell comprising:

a polymer electrolyte membrane;

a first electrode and a second electrode that sandwich the polymer electrolyte membrane, and have at least a gas diffusion layer;

a first separator having a flow passage used for supplying and discharging a reaction gas to and from the first electrode;

a second separator having a flow passage used for supplying and discharging a reaction gas to and from the second electrode; and a frame member that has rectangular opening sections placed on peripheral edge portions of the first electrode and the second electrode, wherein a first elastic member is formed between an outer edge of the first electrode and an inner edge of the frame member on a first electrode side, at least one portion of an outer edge of the gas diffusion layer of the first electrode is placed so as to be extended outside an outer edge of the gas diffusion layer of the opposing second electrode, and at least one portion of the outer edge of the gas diffusion layer of the first electrode and at least one portion of an inner edge of the frame member on the second electrode side are placed to face with each other.

According to a 17th aspect of the present invention, there is provided the solid polymer electrolytic fuel cell according to the 16th aspect, wherein a second elastic member is further placed between the outer edge of the second electrode and the inner edge of the frame member on a first electrode side.

EFFECTS OF THE INVENTION

In accordance with the above-mentioned structure, for example, the anode-side elastic member having the frame shape on the plan view and the cathode-side elastic member having the frame shape on the plan view are placed on the edge portion inside the frame member supporting the polymer electrolyte membrane and the like, and each of the elastic members is allowed to have the length equal to or longer than the gap dimension between the membrane-electrode-frame assembly and the separator in the assembled state of the single cell modules, with the elastic member being elastically deformed in a thickness direction of the membrane-electrode-frame assembly in the assembled state of the single cell modules, so that the gap between the membrane-electrode-frame assembly and the separator is sealed in a tight contact state. With this arrangement, the anode-side elastic member is elastically deformed between the frame member and the anode-side separator at the time of assembling the single cells so that the elastically deformed anode-side elastic member is placed in tight contact in the gap between the frame member and the anode-side separator to seal the gap, thereby exerting a sealing effect. In the same manner, on the cathode side also, the cathode-side elastic member is elastically deformed between the frame member and the cathode-side separator at the time of assembling the single cells so that the elastically deformed cathode-side elastic member is placed in tight contact in the gap between the frame member and the cathode-side separator to seal the gap, thereby exerting a sealing effect.

As a result, by the elastically deformed anode-side elastic member and the elastically deformed cathode-side elastic member, the gaps between the frame member and the anode-side separator as well as between the frame member and the cathode-side separator are respectively sealed in a tight contact state so that it becomes possible to effectively restrain a cross-leak phenomenon occurring through the gap between the polymer electrolyte membrane and the frame, and also to respectively restrain a short-circuiting flow of a reducing agent gas along the edge portion of the frame member and a short-circuiting flow of an oxidizing agent gas along the edge portion of the frame member, thereby making it possible to further improve the utilization rates of the reducing agent gas and the oxidizing agent gas, and consequently to further improve the performance of the polymer electrolytic fuel cell.

Moreover, by providing a number of anode-side ribs and cathode-side ribs that are placed in the edge portion inside the frame member supporting the polymer electrolyte membrane and the like at predetermined intervals, the anode-side elastic member and the anode-side ribs are respectively elastically deformed between the frame member and the anode-side separator at the time of assembling the single cells so that the elastically deformed portions are allowed to intrude into the space, for example, to the adjacent anode-side rib; thus, the elastically deformed anode-side elastic member and the elastically deformed anode-side ribs are placed in virtually continuous tight contact in the gap between the frame member and the anode-side separator to seal the gap, thereby exerting a sealing effect. Moreover, on the cathode side also, the cathode-side elastic member and the cathode-side ribs are respectively elastically deformed between the frame member and the cathode-side separator at the time of assembling the single cells so that the elastically deformed portions are allowed to intrude into the space, for example, to the adjacent cathode-side rib; thus, the elastically deformed cathode-side elastic member and the elastically deformed cathode-side ribs are placed in virtually continuous tight contact in the gap between the frame member and the anode-side separator to seal the gap, thereby exerting a sealing effect.

As a result, by the elastically deformed anode-side elastic member and the elastically deformed anode-side rib as well as by the elastically deformed cathode-side elastic member and the elastically deformed cathode-side rib, the gaps between the frame member and the anode-side separator as well as between the frame member and the cathode-side separator are respectively sealed in a tight contact state so that it becomes possible to effectively restrain a cross-leak phenomenon occurring through the gap between the polymer electrolyte membrane and the frame, and also to respectively restrain a short-circuiting flow of a reducing agent gas along the edge portion of the frame member and a short-circuiting flow of an oxidizing agent gas along the edge portion of the frame member, thereby making it possible to further improve the utilization rates of the reducing agent gas and the oxidizing agent gas, and consequently to further improve the performance of the polymer electrolytic fuel cell.

BRIEF DESCRIPTION OF DRAWINGS

These and other aspects and features of the present invention will become clear from the following description taken in conjunction with the preferred embodiments thereof with reference to the accompanying drawings, in which.

DETAILED DESCRIPTION OF THE INVENTION

Figure 1:
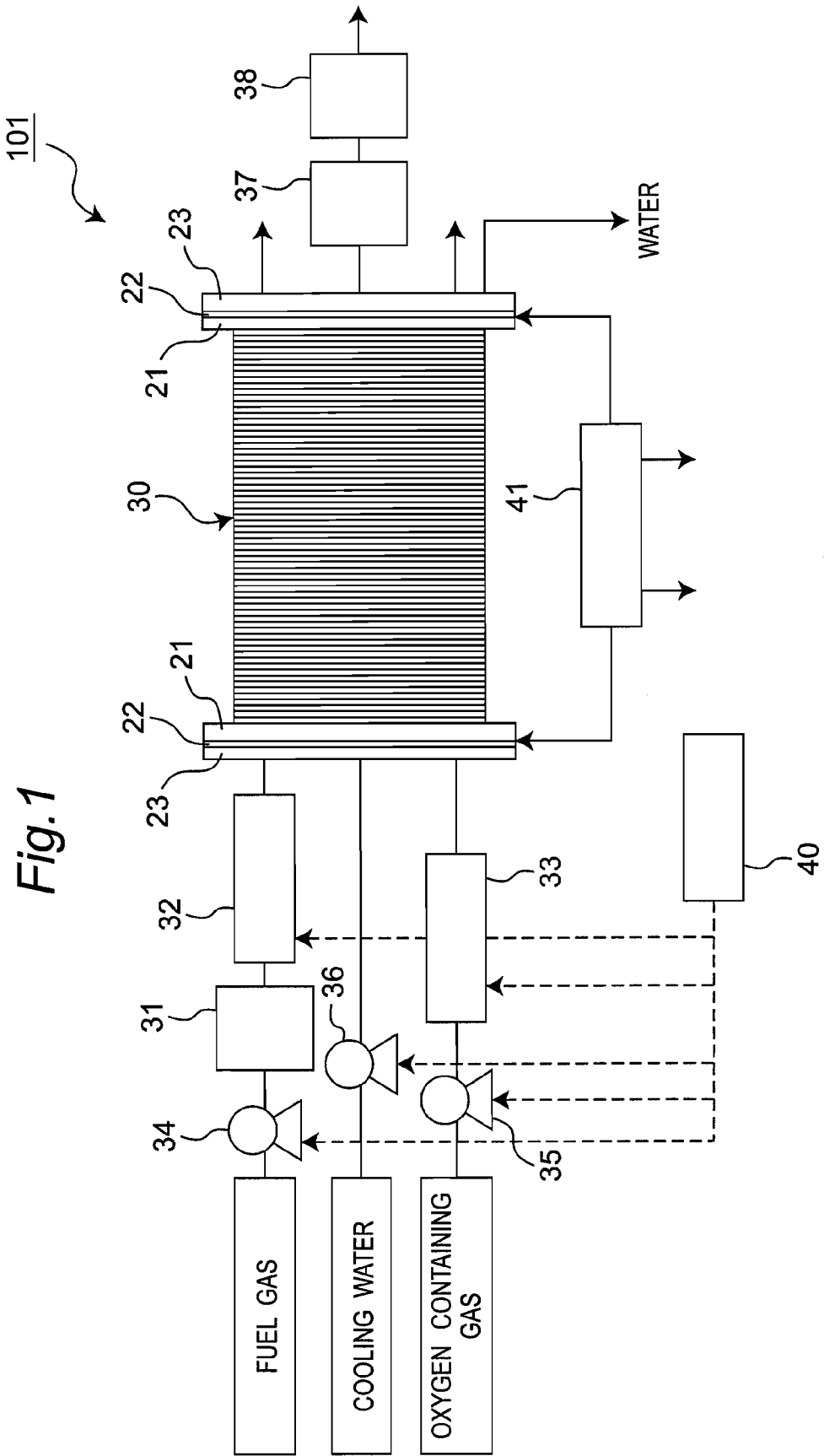
FIG. 1 is a schematic constitution view that schematically shows a structure of a fuel cell provided with a stack for a fuel cell in accordance with one embodiment of the present invention.

Before the description of the present invention proceeds, it is to be noted that like parts are designated by like reference numerals throughout the accompanying drawings.

Referring to drawings, the following description will discuss embodiments of the present invention in detail.

First Embodiment

FIG. 1 is a schematic constitution view that schematically shows a structure of a fuel cell provided with a stack for a fuel cell in accordance with one embodiment of the present invention. Moreover, FIG. 2 is a schematic exploded view that shows a stack for a fuel cell possessed by the fuel cell 101 shown in FIG. 1 (hereinafter, referred to as stack).

The fuel cell 101, which is, for example, a solid polymer electrolytic fuel cell (PEFC), is designed to generate electric power, heat, and water simultaneously, by allowing a fuel gas containing hydrogen and an oxidizing agent gas containing oxygen such as air to react with each other electrochemically. As shown in FIG. 1, the fuel cell 101 is provided with a stack 30 having a laminated structure in which a plurality of fuel cells (or a single cell), each having a pair of anode and cathode electrodes, are series-connected with one another, a fuel processing device 31 for taking out hydrogen from a fuel gas, an anode humidifier 32 for improving the power generating efficiency by humidifying a fuel gas containing hydrogen taken out by the fuel processing device 31, a cathode humidifier 33 for humidifying the oxygen containing gas (oxidizing agent gas), and pumps 34 and 35 used for respectively supplying the fuel gas and the oxygen-containing gas. That is, the fuel processing device 31, the anode humidifier 32, and the pump 34 form a fuel supply device for supplying the fuel gas to the respective cells of the stack 30, and the cathode humidifier 33 and the pump 35 form an oxidizing agent supply device for supplying the oxidizing agent gas to the respective cells of the stack 30. Here, various other modes may be adopted as these fuel supply device and oxidizing agent supply device as long as they have functions for supplying the fuel and the oxidizing agent, and in the present embodiment, any supply devices may be used as long as they commonly supply the fuel and oxidizing agent to a plurality of cells possessed by the stack 30 so as to desirably obtain effects of the present embodiment, which will be described later.

Moreover, the fuel cell 101 is provided with a pump 36 used for circulating and supplying cooling water for effectively removing heat generated by the stack 30 upon generating power, a heat exchanger 37 used for heat-exchanging the heat removed by this cooling water (for example, liquid having no conductivity, such as pure water) into a fluid such as tap water and a hot-water reserving tank 38 used for storing the tap water that has been heat-exchanged. The fuel cell 101 is further provided with an operation control device 40 for controlling the operation for generating power by making these respective components associated with one another, and an electricity output unit 41 used for taking out electricity generated by the stack 30.

Figure 2:
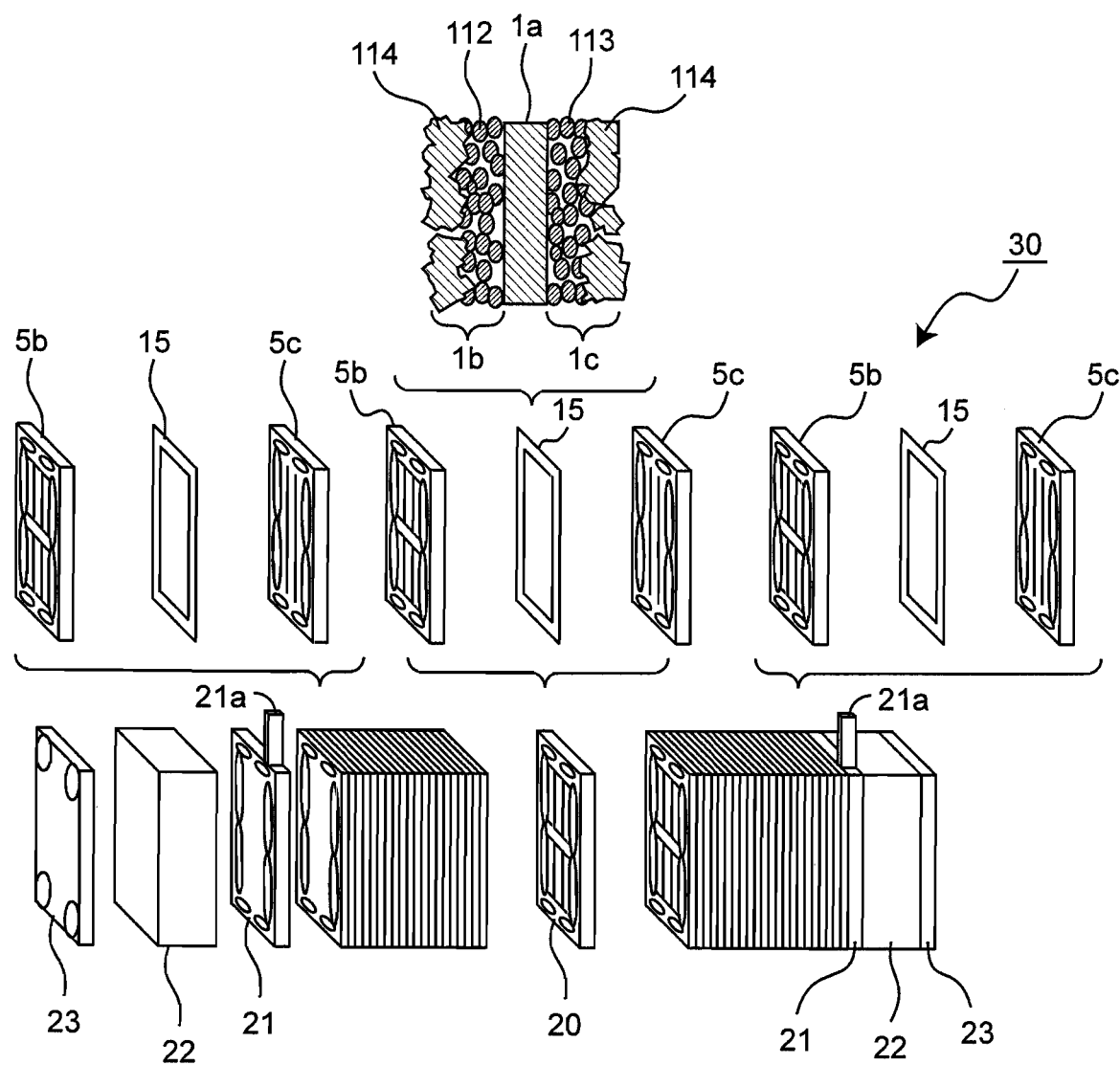
FIG. 2 is a schematic exploded view that shows the stack for a fuel cell installed in the fuel cell shown in FIG. 1.

Furthermore, as shown in FIG. 2, the stack 30 installed in the fuel cell 101 has a structure in which a plurality of single cells (single cell module) 20, each serving as a basic unit component, are laminated, and these cells are fastened with one after another by applying a predetermined load from each of the two sides 23 through a collector plate 21, an insulating plate 22, and an end plate 23. A current take-out terminal unit 21a is attached to each of the collector plates 21, and upon power generation, an electric current, that is, electricity, is taken out from this unit. Each of the insulating plates 22 insulates the collector plate 21 and the end plate 23 from each other, and introduction inlets and discharging outlets for gas and cooling water, not shown, are formed therein in some cases. The respective end plates 23 fasten the laminated single cells 20, the collector plates 21, and the insulating plates 22 with one another so as to be held therebetween by applying a predetermined load thereto from a pressing means, not shown.

As shown in FIG. 2, the single cell 20 is formed by sandwiching an MEA (membrane-electrode assembly) 15 between a pair of separators 5b and 5c. The MEA 15 has a structure in which a catalyst layer (anode-side catalyst layer) 112, mainly composed of carbon powder with a platinum-ruthenium alloy catalyst deposited thereon, is formed on an anode surface side of a polymer electrolyte membrane 1a that selectively transfers hydrogen ions, while a catalyst layer (cathode-side catalyst layer) 113, mainly composed of carbon powder with a platinum catalyst deposited thereon is formed on a cathode surface side thereof, with a gas diffusion layer 114 having both of a ventilating property for a fuel gas or an oxidizing agent gas and an electron conductive property being placed on the outer surface of each of the catalyst layers 112 and 113. The polymer electrolyte membrane 1a is generally prepared as a solid polymer material having a proton conductive property, for example, a perfluorosulfonic acid membrane (Nafion membrane made by Du Pont de Nemours and Company). Here, in the following description, the anode-side catalyst layer 112 and the gas diffusion layer 114 are combinedly referred to as an anode electrode 1b, and the cathode-side catalyst layer 113 and the gas diffusion layer 114 are combinedly referred to as a cathode electrode 1c.

Here, in the present specification and the claims, the electrode means one that includes at least a GDL (gas diffusion layer).

Any conductive material may be used as the separators 5b and 5c, as long as it is a non-gas-permeable conductive material, and for example, a material formed by cutting a resin-impregnated carbon material into a predetermined shape and a material obtained by molding a mixture of carbon powder and a resin material are generally used. A concave-shaped groove portion is formed at a portion of each of the separators 5b and 5c, which is placed in contact with the MEA 15, and this groove portion is placed in contact with the gas diffusion layer 114 so that a gas flow passage, used for supplying a fuel gas or an oxidizing agent gas to an electrode surface, and for carrying excessive gas out therefrom, is formed. With respect to the base member for the gas diffusion layer 114, a material made from carbon fibers is generally used, and for example, carbon fiber woven cloth may be used as such a base member.

Figure 3A:
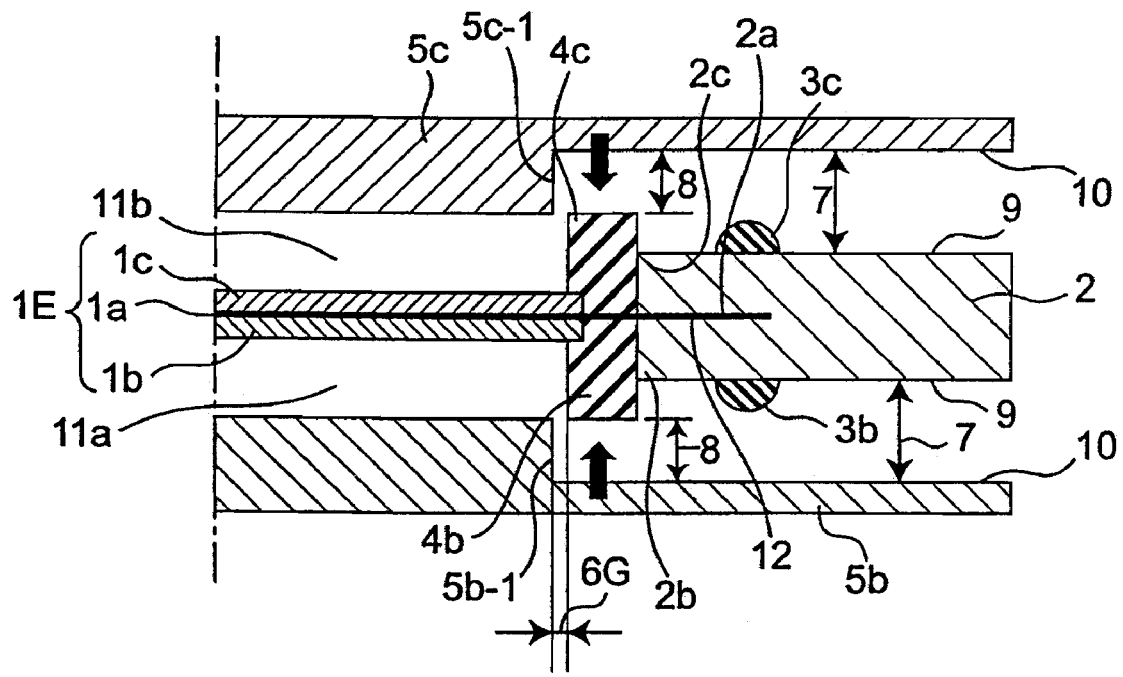
FIG. 3A is a schematic cross-sectional view showing a single cell of the stack for a fuel cell prior to an assembling process.
Figure 3B:
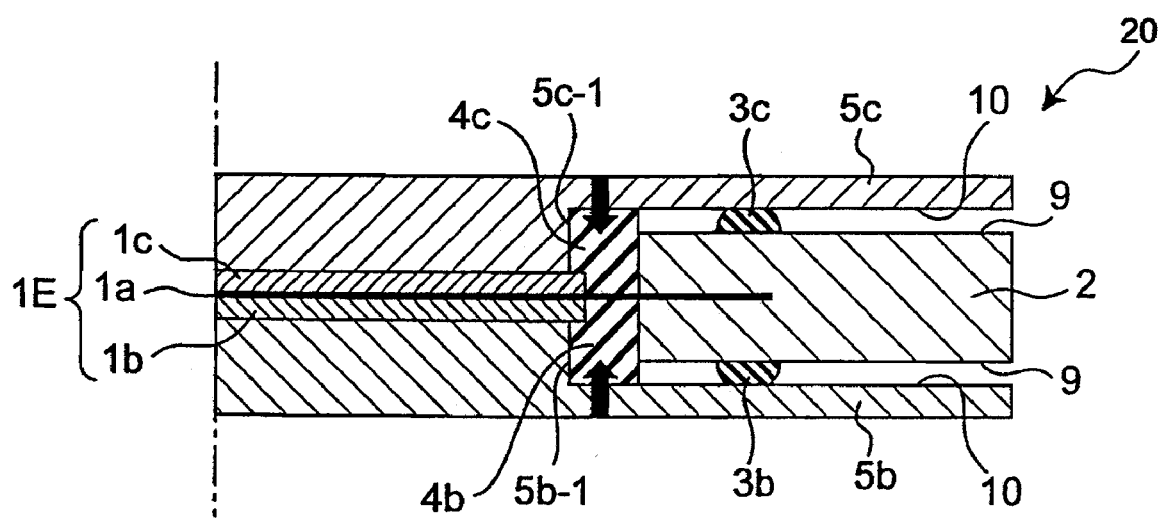
FIG. 3B is a schematic cross-sectional view showing the single cell after the assembling process.

FIGS. 3A and 3B show one example of the single cell 20 in an enlarged manner.

The single cell (single cell module) 20 is constituted by a membrane-electrode-frame assembly (MEA (membrane-electrode assembly)) 15 that has an electrode unit 1E configured by a rectangular polymer electrolyte membrane 1a to one of the surfaces of which an anode electrode 1b is joined, with a cathode electrode 1c being joined to the other surface of the electrolyte membrane 1a, and gas supply units 2x and 2y (see FIGS. 8A to 8C) that are used for supplying a fuel gas and an oxidizing agent gas respectively to the anode electrode 1b and the cathode electrode 1c, and placed on the peripheral edge portion of the electrode unit 1E, and is also provided with a rectangular frame member 2, made of a rigid member, and used for forming manifolds, and a pair of separators 5b and 5c that sandwich the electrode unit 1E and the membrane-electrode-frame assembly 15 from the anode side and the cathode side, and these single cells 20 are laminated so that a polymer electrolytic fuel cell 101 is constructed.

In the above-mentioned structure, for example, the peripheral edge portion of the polymer electrolyte membrane 1a is inserted to a slit 2a of the frame member 2 for insertion of the polymer electrolyte membrane, and sandwiched therein so that the polymer electrolyte membrane 1a and the frame member 2 are mechanically combined with each other. Moreover, the anode electrode 1b and the cathode electrode 1c are bonded to and secured on the two surfaces of the polymer electrolyte membrane 1a.

In this manner, the MEA (membrane-electrode assembly) 15 is formed by bonding the anode electrode 1b and the cathode electrode 1c to the two surfaces of the polymer electrolyte membrane 1a to be secured thereon, and this MEA (membrane-electrode assembly) 15 is sandwiched by the pair of separators 5b and 5c so that the above-mentioned single cell 20 is formed. In the single cell 20, the separator 5b on the anode electrode side faces the anode electrode 1b, and the separator 5c on the cathode electrode side faces the cathode electrode 1c.

Figure 3C:
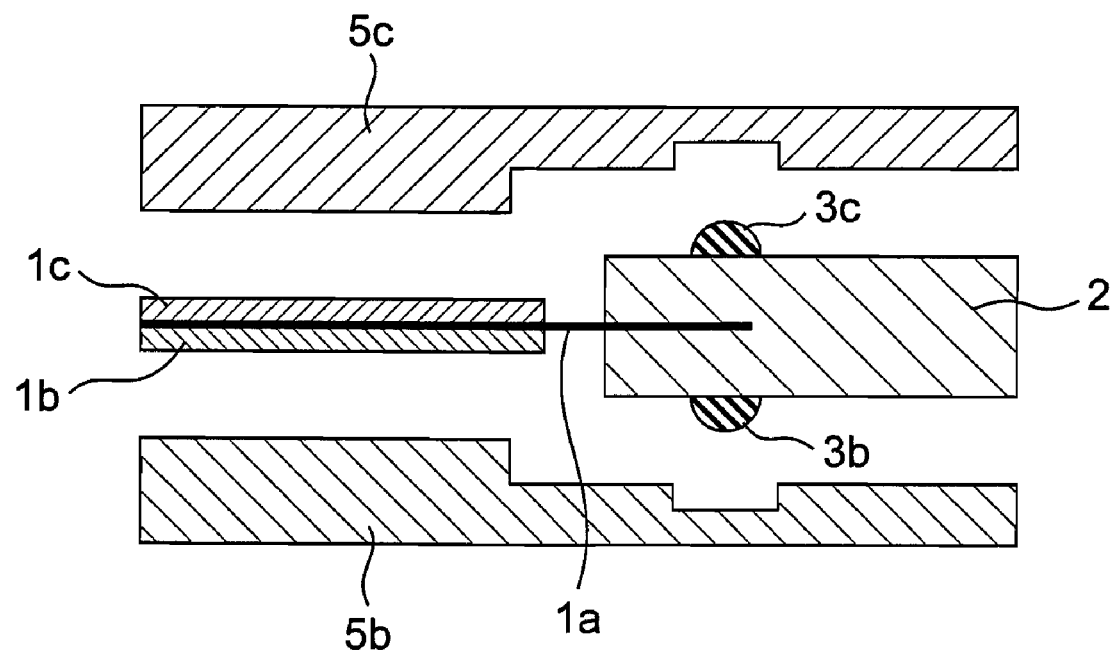
FIG. 3C is a schematic cross-sectional view showing a single cell for the stack for a fuel cell of a comparative example with no elastic member being placed, prior to the assembling process of the single cell.
Figure 3D:
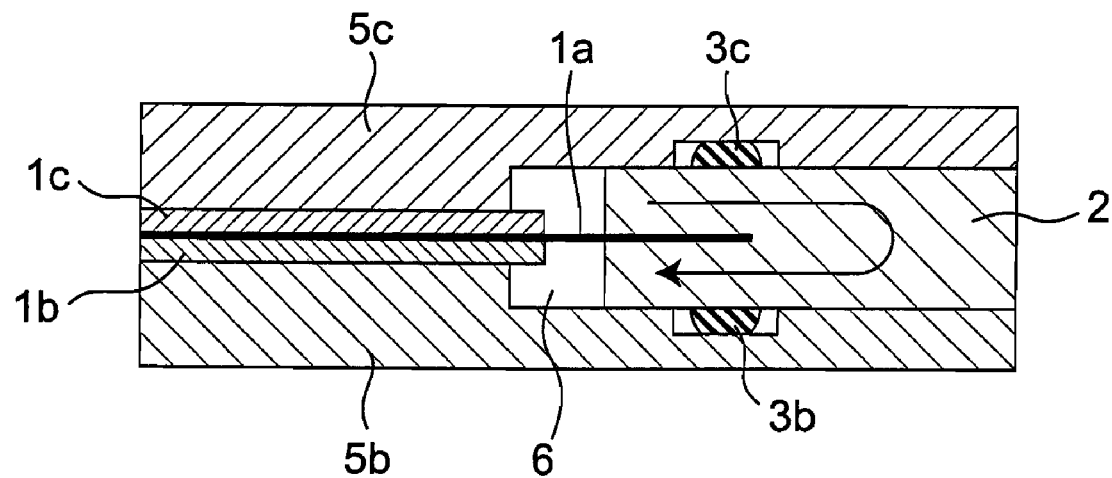
FIG. 3D is a schematic cross-sectional view showing a single cell with no elastic member being placed of the comparative example, after the assembling process.

As shown in FIGS. 3C and 3D, in the case of the single cell after the assembling process, with no elastic member attached thereto, which will be described below, a gap 6 in a range of from 0.1 mm to 10 mm is formed between each of the outer edge of the anode electrode 1b and the outer edge of the cathode electrode 1c and each of the inner edges 2b and 2c of the frame member 2. When this gap 6 is present, a phenomenon, referred to as cross-leak, occurs in which one portion of the gas supplied into the fuel cell is discharged through this gap 6. In order to eliminate this gap 6, a method is proposed as shown in FIG. 3A in which an anode-side elastic member 4b, which has a rectangular frame-shape on the plan view and a rectangular shape on its cross section (in another example, a virtually parallelogram as shown in FIG. 4E), is placed so as to contact with both of the inner edge 2b of the frame member 2 on the anode side and the outer edge of an anode electrode 1b, and upon molding the frame member 2 and the anode electrode 1b, the anode-side elastic member 4b is integrally formed together with these. Moreover, a cathode-side elastic member 4c, which has a rectangular frame-shape on the plan view and a rectangular shape on its cross section (in another example, a virtually parallelogram as shown in FIG. 4E), is placed so as to contact with both of the inner edge 2c of the frame member 2 on the cathode side and the outer edge of a cathode electrode 1c, and upon molding the frame member 2 and the cathode electrode 1c, the cathode-side elastic member 4c is integrally formed together with these. At this time, these elastic members 4b and 4c may be respectively placed in contact with the polymer electrolyte membrane 1a and mechanically joined thereto, and need not be bonded thereto.

Upon laminating the separators 5b and 5c on the frame member 2 to be assembled thereon with the elastic members 4b and 4c being installed therein, as shown in FIG. 3B, the frame member assembled surface 9 of the frame member 2 and the respective separator assembled surfaces 10 of the separators 5b and 5c are respectively placed close to each other, and at this time, the elastic members 4b and 4c are placed, with a gap 8 between the elastic members 4b, 4c and the opposing surfaces of the separators 5b, 5c being made smaller than a gap 7 between the frame member 2 and the separators 5b, 5c. With this arrangement, during the assembling process, the elastic members 4b, 4c are positively placed in contact with the separators 5b and 5c so that the elastic deformations thereof are started, before the frame member assembled surface 9 of the frame member 2 and the respective separator assembled surfaces 10 of the separators 5b, 5c have been placed at the closest positions (see FIG. 3B). Moreover, upon completion of the assembling process, in other words, after the frame member assembled surface 9 of the frame member 2 and the respective separator assembled surfaces 10 of the separators 5b, 5c have been placed at the closest positions, as shown in FIG. 3B, the elastic members 4b and 4c are pressed by the separators 5b and 5c into elastically deformed states so that the elastic members 4b and 4c are subjected to compressing forces imposed from the separators 5b and 5c. At this time, as indicated by reference numeral 6G in FIG. 3A, before and after the assembling processes of the elastic members 4b and 4c, the elastic members 4b and 4c are mutually widened along the separator assembled surfaces 10 by a dimension 6G so that gaps between the elastic members 4b, 4c and step portions 5b-1, 5c-1 of the separators 5b, 5c on the separator assembled surface 10 (in other words, gaps through which one portion of gas supplied into the fuel cell is discharged) can be eliminated prior to the assembling process, thereby making it possible to effectively suppress the cross-leak phenomenon.

Figure 3E:
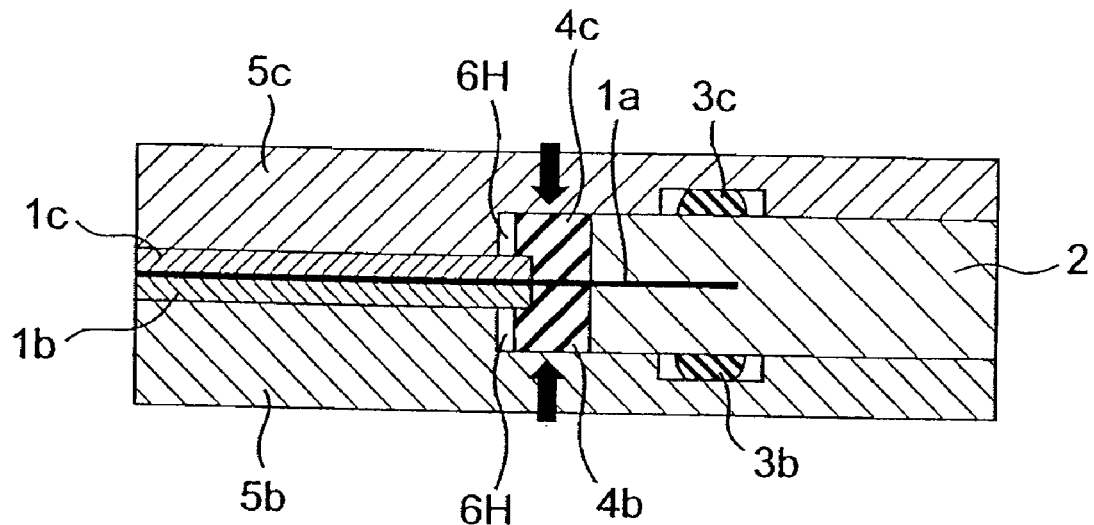
FIG. 3E is a schematic cross-sectional view that shows a single cell of the stack for a fuel cell after the assembling process, for explaining a state that causes a slight gap that might be caused by a precision error upon assembling.
Figure 3F:
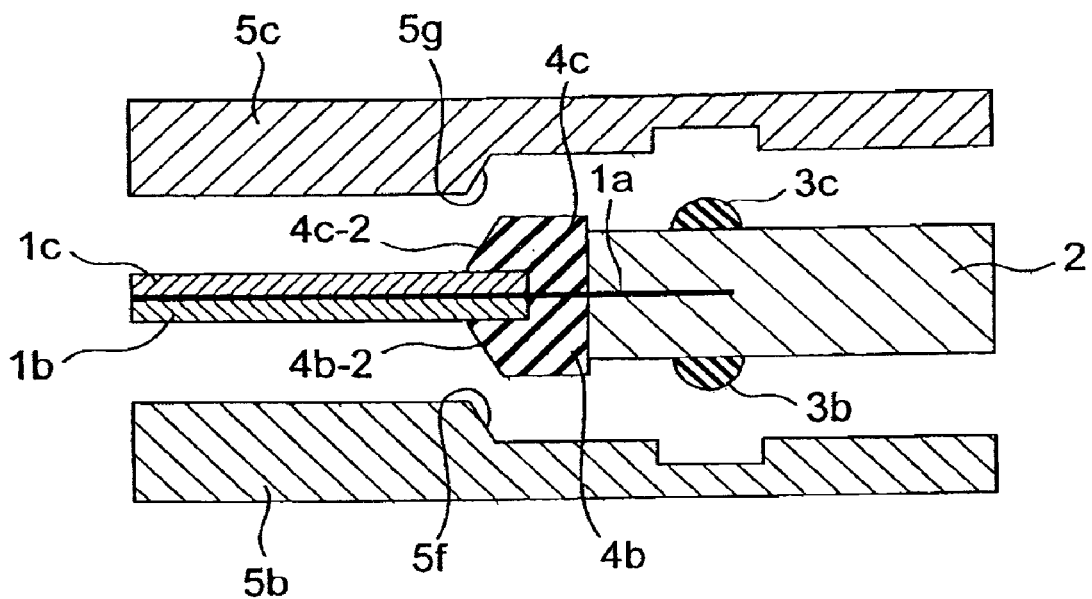
FIG. 3F is a schematic cross-sectional view that shows a single cell of the stack for a fuel cell prior to an assembling process, for explaining that the slight gap that might be caused due to the precision error upon assembling needs to be removed.
Figure 3G:
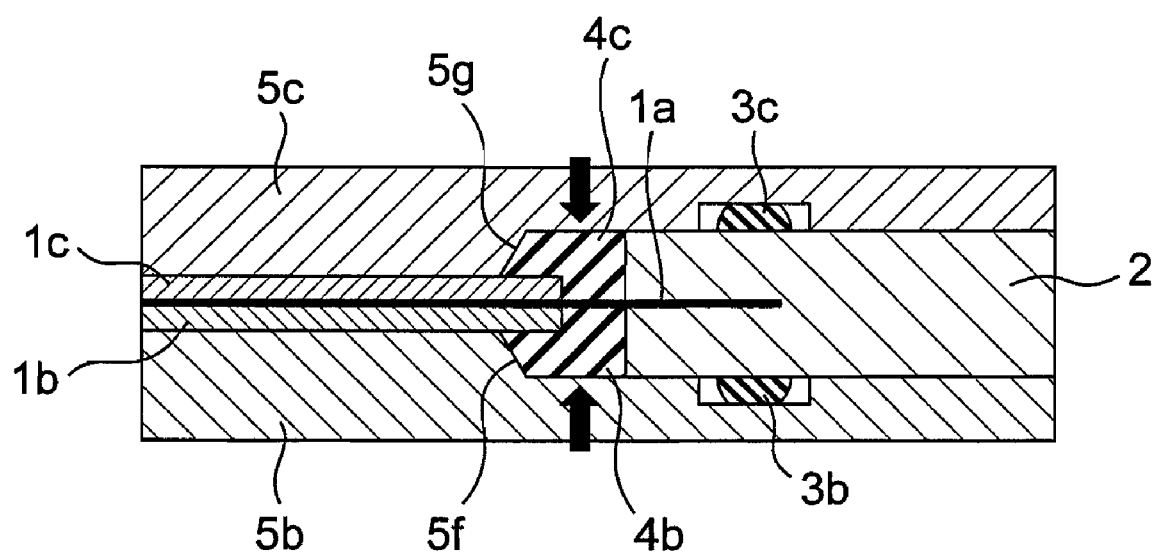
FIG. 3G is a schematic cross-sectional view that shows a single cell of the stack for a fuel cell after the assembling process, for explaining that the slight gap that might be caused due to the precision error upon assembling needs to be removed.
Figure 4A:
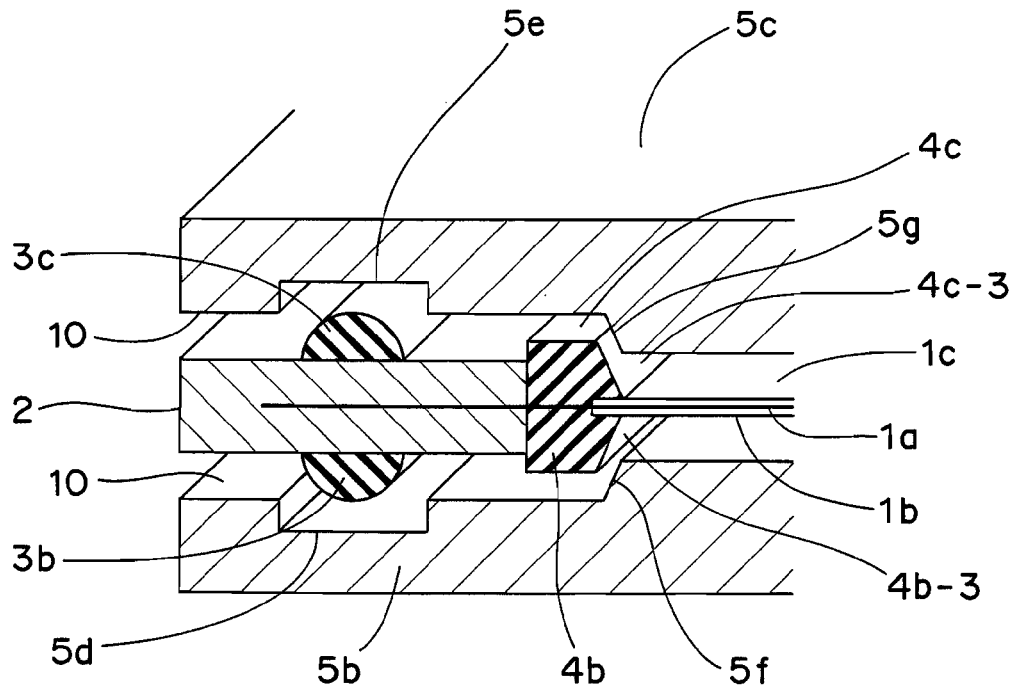
FIG. 4A is a perspective view that shows the single cell prior to the assembling process.
Figure 4B:
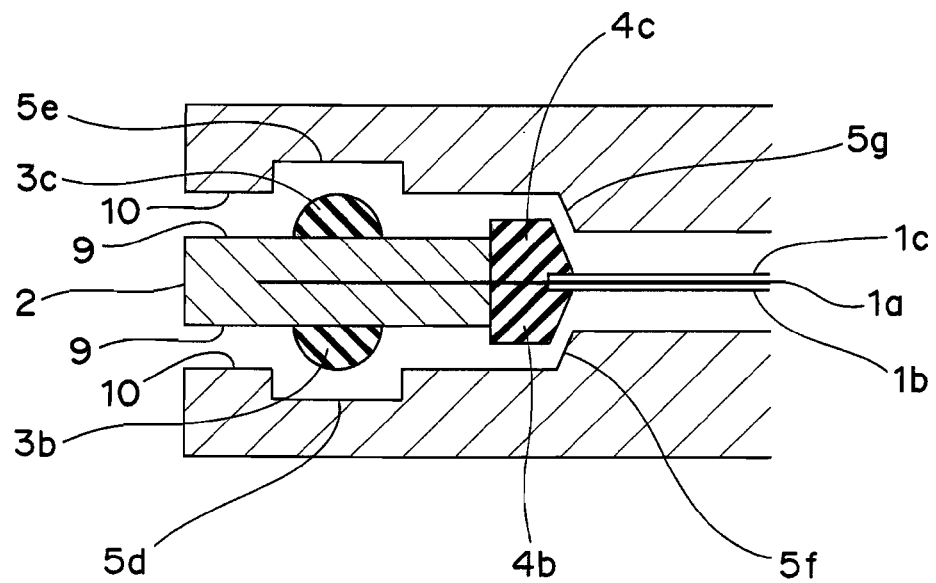
FIG. 4B is a partially enlarged schematic cross-sectional view showing the single cell prior to the assembling process.
Figure 4C:
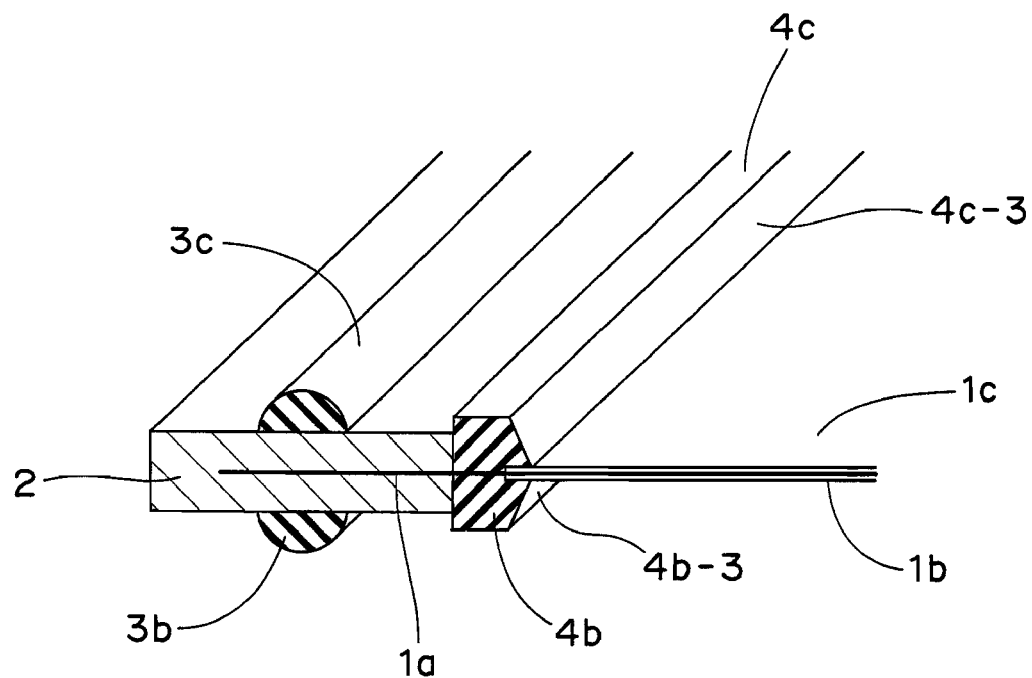
FIG. 4C is a perspective view that shows the single cell after the assembling process.
Figure 4D:
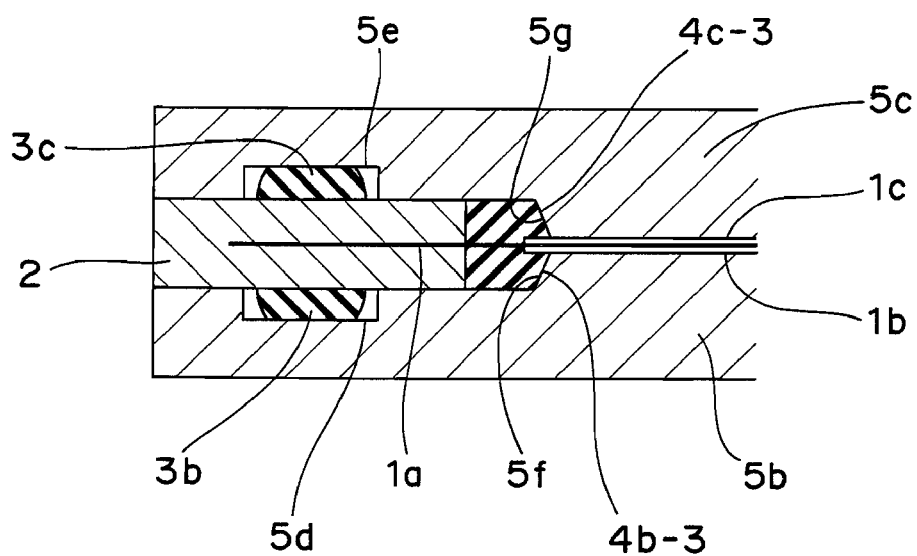
FIG. 4D is a partially enlarged schematic cross-sectional view showing a single cell with ribs after an assembling process.
Figure 4E:
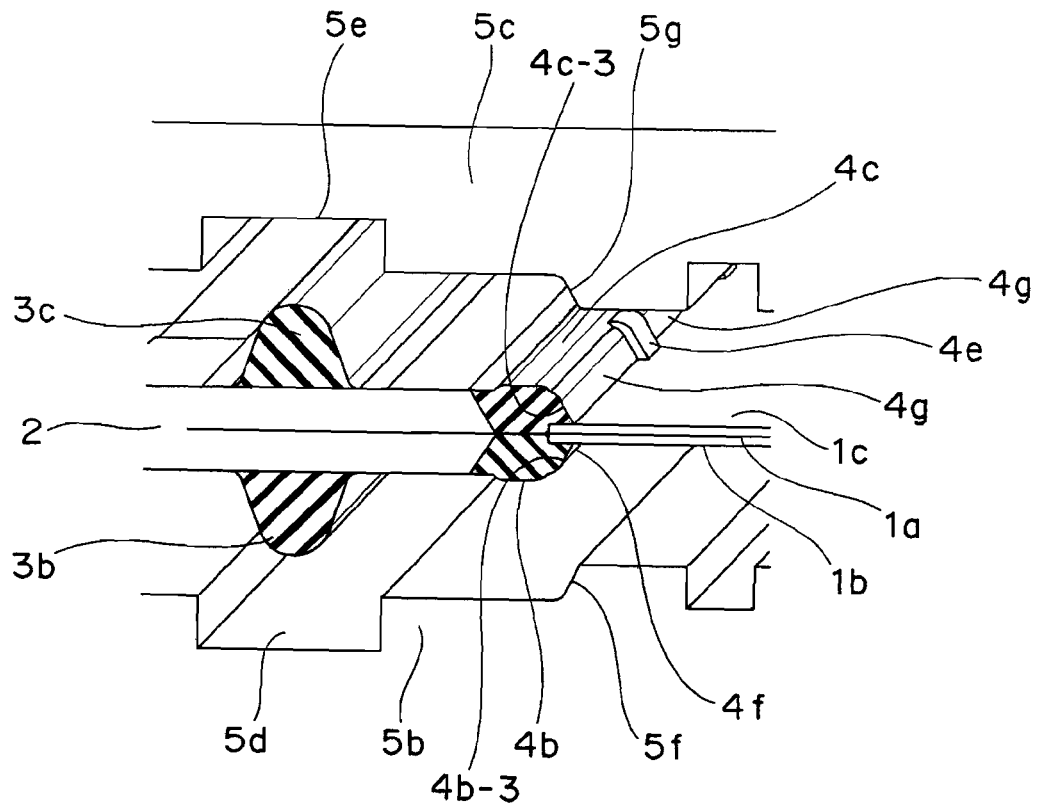
FIG. 4E is a perspective view that shows the single cell with ribs prior to the assembling process.

However, as shown in FIG. 3E, a slight gap 6H might remain due to an error in assembling precision in some cases, and in such a case, as shown in FIG. 3F and FIGS. 4A to 4B, moderate inclined surfaces 5f and 5g are formed on the step portions 5b-1 and 5c-1 (see FIG. 3A) of the separators 5b and 5c on the separator assembled surface 10 from the outside of the separators 5b and 5c in FIG. 3F toward the inside thereof. Here, in association with these inclined surfaces 5f and 5g, an anode-side inclined surface 4b-2 and a cathode-side inclined surface 4c-2 having virtually the same inclined angle are formed on the elastic members 4b and 4c with cross-sectional shapes as shown in FIG. 3F, along the entire circumferences thereof in the shapes on the plan view. As a result, as shown in FIGS. 3F to 3G as well as in FIGS. 4A to 4D, upon assembling the separators 5b and 5c on the frame member 2 so as to be laminated thereon, with the elastic members 4b and 4c being attached thereto, before the frame member assembled surface 9 of the frame member 2 and the respective separator assembled surfaces 10 of the separators 5b and 5c, whose opposing inclined surfaces are virtually kept in parallel with each other, have been placed at the closest positions (see FIG. 3G and FIG. 4D), the elastic members 4b and 4c are positively placed in contact with the separators 5b and 5c so that elastic deformations thereof are started. At this time, the inclined surfaces 4b-2 and 4c-2 of the elastic members 4b and 4c are placed in contact with the inclined surfaces 5f and 5g of the separators 5b and 5c, and upon completion of the assembling process, in other words, after the frame member assembled surface 9 of the frame member 2 and the respective separator assembled surfaces 10 of the separators 5b, 5c have been respectively placed at the closest positions, as shown in FIGS. 3G and 4D, the elastic members 4b and 4c are pressed by the separators 5b and 5c into elastically deformed states respectively so that the elastic members 4b and 4c are subjected to compressing forces imposed from the separators 5b and 5c, while the inclined surfaces 4b-2 and 4c-2 of the elastic members 4b and 4c are placed in tight contact with the inclined surfaces 5f and 5g of the separators 5b and 5c, with the compressing forces being applied thereto. Therefore, such a slight gap 6H that might be caused by an error in assembling precision can be eliminated so that it becomes possible to suppress a cross-leak phenomenon from occurring in the inner edge portion of the frame member, and consequently to further effectively restrain the cross-leak phenomenon as a whole.

With respect to the inner edges of the elastic members 4b and 4c, upon laminating the separators 5b and 5c on the frame member 2 to be assembled thereon, even when the elastic members 4b and 4c come into contact with the separators 5b and 5c, the possibility of the separators 5b and 5c being damaged is low because of the elastic force of the elastic members 4b and 4c; therefore, the gap 6G between the separators 5b, 5c and the elastic members 4b, 4c can be made narrower than that in the conventional structure without the elastic members. Depending on cases, even when the distance of the gap 6G is zero, no issue arises because the elastic members 4b and 4c are prepared.

Figure 4F:
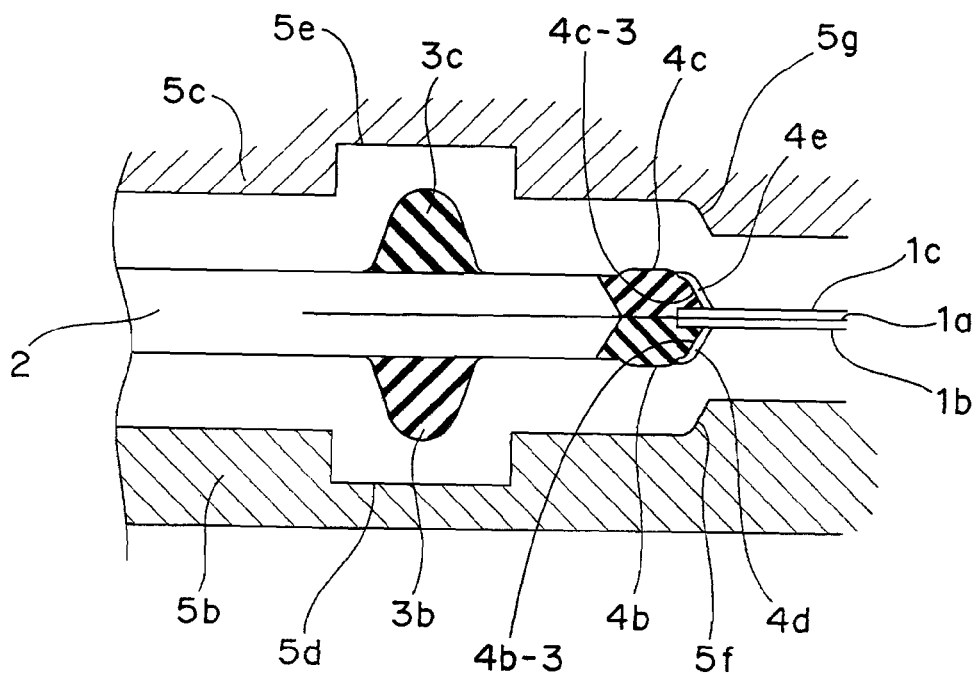
FIG. 4F is a partially enlarged schematic cross-sectional view showing the single cell with ribs prior to an assembling process.
Figure 4G:
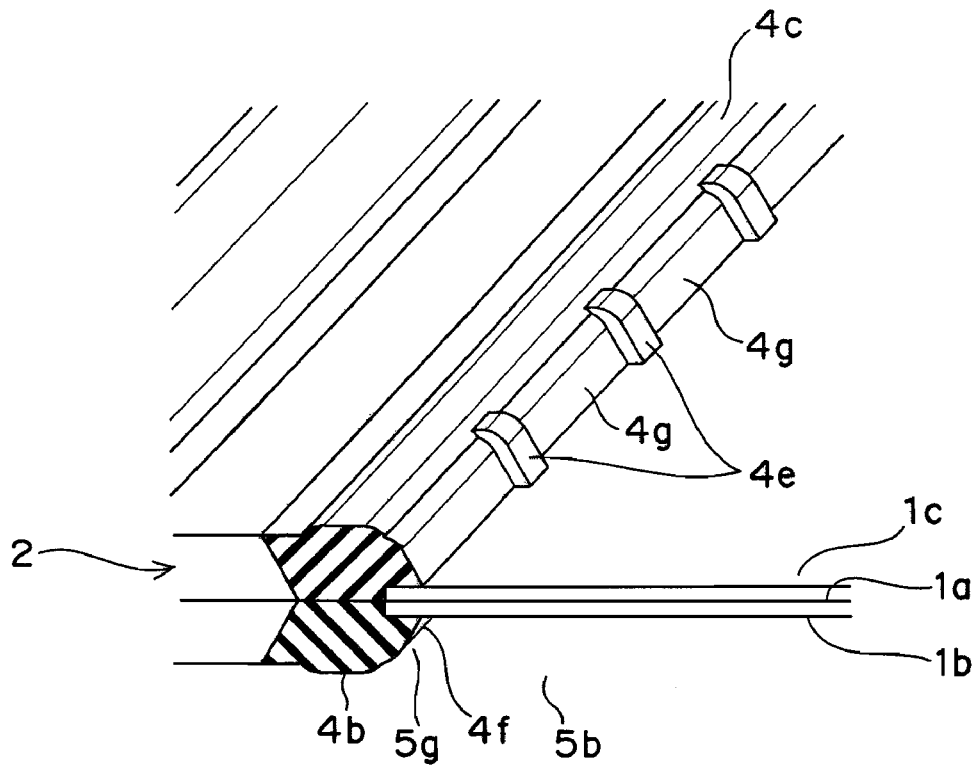
FIG. 4G is a perspective view that shows the single cell with ribs after the assembling process.
Figure 4H:
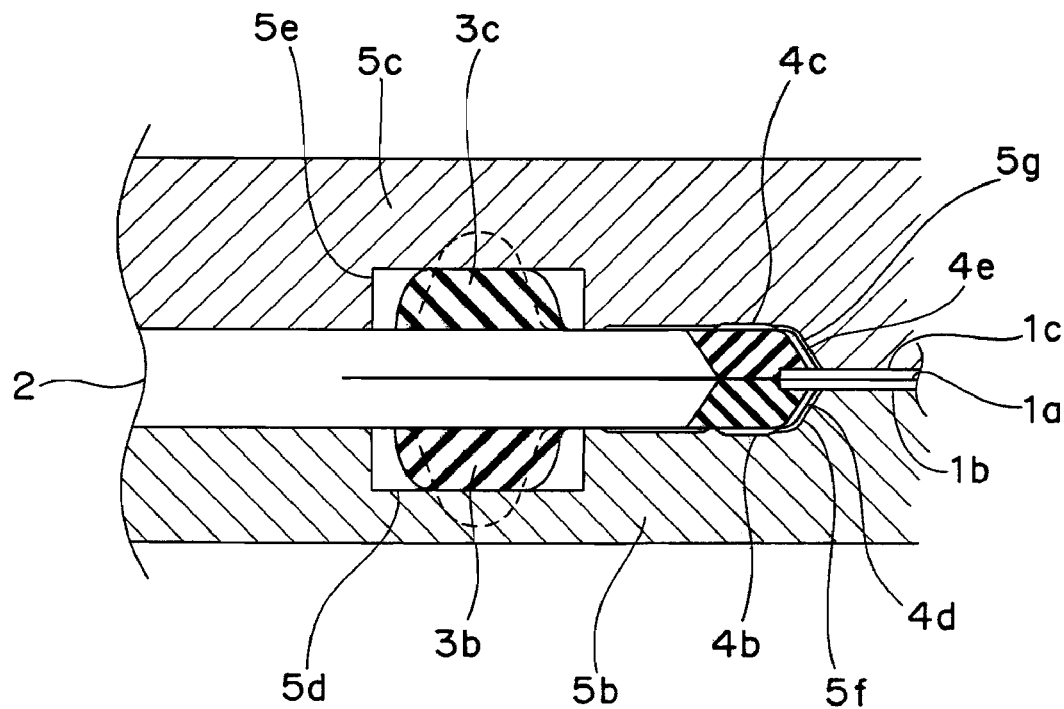
FIG. 4H is a partially enlarged schematic cross-sectional view showing the single cell with ribs after the assembling process.
Figure 4I:
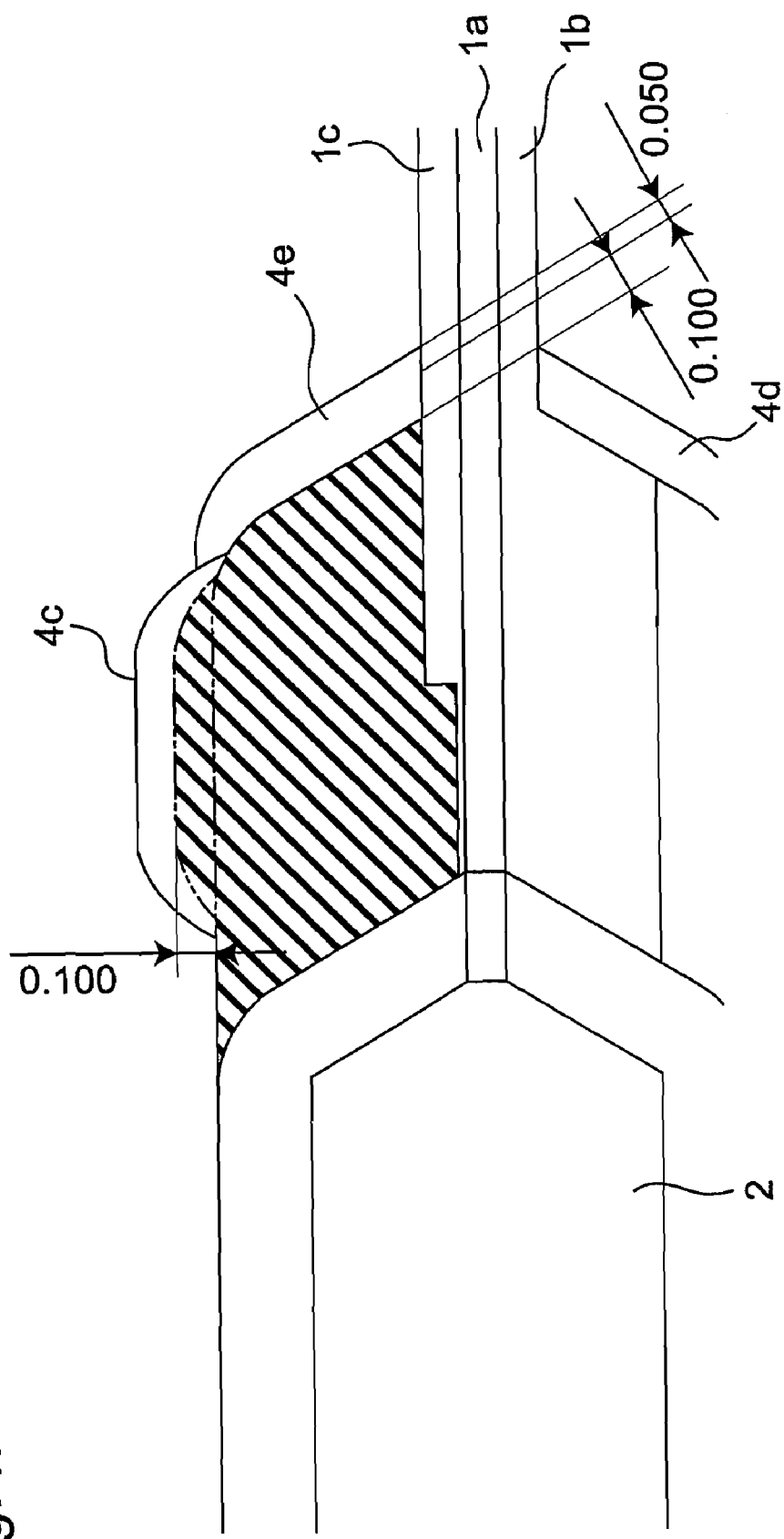
FIG. 4I is an enlarged schematic cross-sectional view showing a portion near an elastic member of the single cell.

Moreover, another example is proposed in which, as shown in FIGS. 4E and 4F, an anode-side inclined surface 4b-3 and a cathode-side inclined surface 4c-3 are respectively prepared on the entire circumferences of the elastic members 4b and 4c, and anode-side ribs 4d and cathode-side ribs 4e that protrude for use in preventing a short-cut may be respectively formed on the anode-side inclined surface 4b-3 and the cathode-side inclined surface 4c-3. The ribs 4d and 4e are formed respectively on the inclined surfaces 4b-3 and 4c-3 at predetermined intervals as protrusions integrally formed thereon. As shown in FIGS. 4G and 4H, upon assembling the single cells, these ribs 4d and 4e are compressed and elastically deformed by the anode-side inclined surface 4b-3 and the cathode-side inclined surface 4c-3 as well as by the inclined surfaces 5f and 5g of the separators 5b and 5 made virtually in parallel therewith so that they are placed in tight contact with the separators 5b and 5c to prevent the gas leakage. When the respective ribs 4d and 4e are compressed and elastically deformed, the elastically deformed portions thereof are allowed to escape into an anode-side concave section (compressed volume releasing portion) 4f between the adjacent anode-side ribs 4d or a cathode-side concave section (compressed volume releasing portion) 4g between the adjacent cathode-side ribs 4e. As shown in FIG. 4I, these concave sections 4f and 4g are designed so that upon assembling the single cells, the anode-side elastic member 4b and the cathode-side elastic member 4c can be respectively compressed by the separators 5b and 5c by, for example, 0.1 mm, with the anode-side rib 4d and the cathode-side rib 4e being respectively compressed by, for example, 0.05 mm. Here, the total volume of the anode-side concave section 4f is set so as to be virtually equal to the total sum of the volume of the entire circumference of the rectangular-frame-shaped anode-side elastic member 4b on the plan view and the total volume of the ribs 4d placed in the longitudinal direction of the anode-side elastic member 4b at predetermined pitch intervals. In other words, this structure means that, when, upon assembling the single cell, compressed and elastically deformed between the separator 5b and the edge portion of the frame member 2, both of the elastically deformed portion of the anode-side elastic member 4b and the elastically deformed portion of the rib 4d are inserted into the anode-side concave section 4f so that the anode-side concave section 4f is filled with the elastically deformed portions without virtually any gap, and sealed. In the same manner, the total volume of the cathode-side concave section 4g is set so as to be virtually equal to the total sum of the volume of the entire circumference of the rectangular-frame-shaped cathode-side elastic member 4c on the plan view and the total volume of the ribs 4e placed in the longitudinal direction of the cathode-side elastic member 4c at predetermined pitch intervals. In other words, this structure means that, when, upon assembling the single cell, compressed and elastically deformed between the separator 5c and the edge portion of the frame member 2, both of the elastically deformed portion of the cathode-side elastic member 4c and the elastically deformed portion of the rib 4e are inserted into the cathode-side concave section 4g so that the cathode-side concave section 4g is filled with the elastically deformed portions without virtually any gap, and sealed. With this arrangement, after the separators have been assembled, no gaps are left in the concave sections 4f and 4g, thereby making it possible to effectively prevent the gas leakage.

Here, the bottom surface of the anode-side concave section 4f and the bottom surface of the cathode-side concave section 4g are respectively formed into the above-mentioned anode-side inclined surface 4b-3 and cathode-side inclined surface 4c-3 of the elastic members 4b and 4c.

Figure 8A:
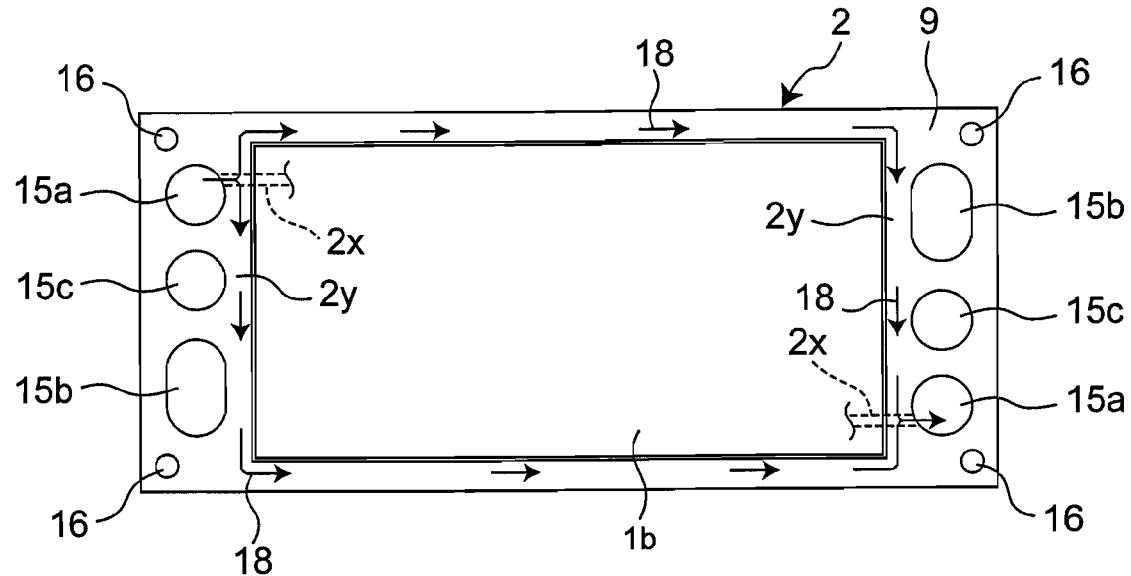
FIG. 8A is a plan view showing a frame member main body of the single cell in accordance with the first embodiment.
Figure 8B:
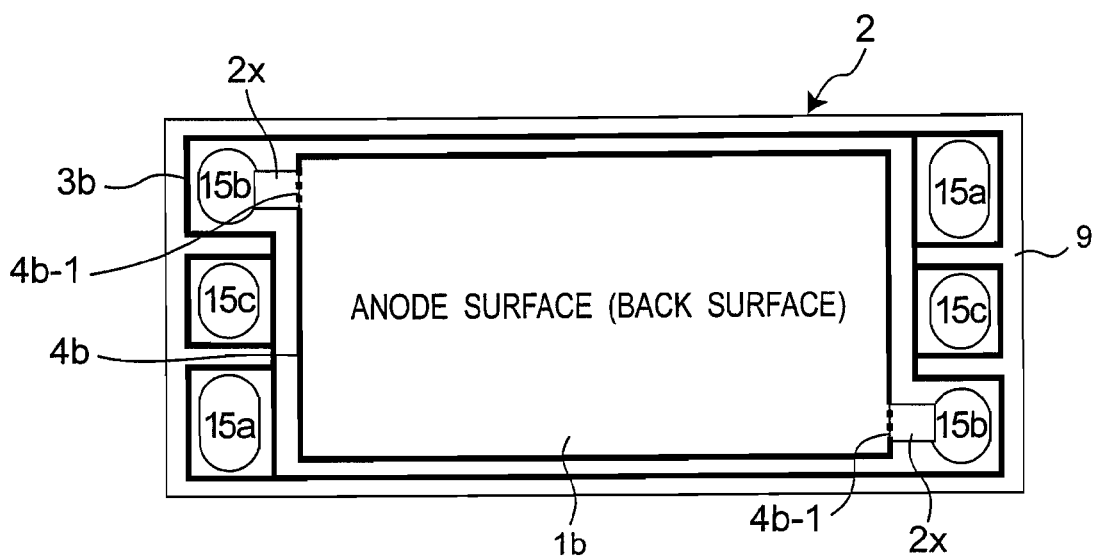
FIG. 8B is a front view showing the surface of the frame member of the single cell on an anode side in accordance with the first embodiment in a state where a gasket is placed on the frame member main body.
Figure 8C:
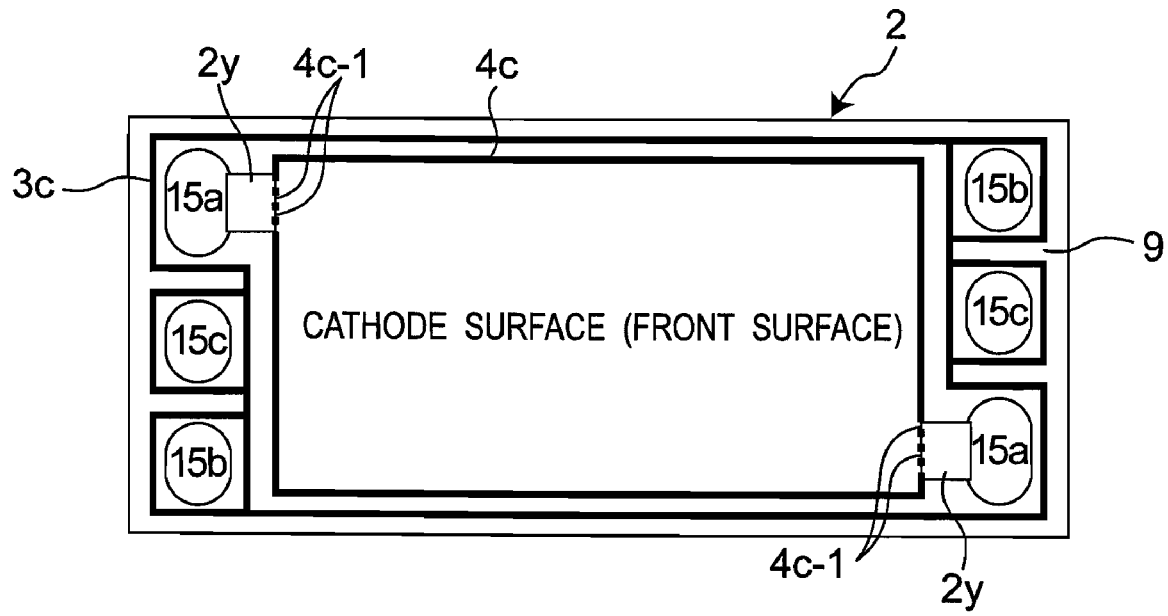
FIG. 8C is a front view showing the surface of the frame member of the single cell on a cathode side in accordance with the first embodiment in a state when a gasket is placed on the frame member main body.

As shown in FIGS. 8A to 8C, at least one pair of manifold holes 15b for fuel gas, manifold holes 15a for oxidizing agent gas and manifold holes 15c for cooling water are formed in the frame member 2, and a plurality of through holes 16 used for inserting bolts (not shown) for mutually fastening the single cells 20 are also formed therein. An oxidizing agent gas is supplied to and discharged from the cathode electrode 1c side through the pair of manifold holes 15a for oxidizing agent gas of the frame member 2. A fuel gas is supplied to and discharged from the anode electrode 1b side through the pair of manifold holes 15b. Moreover, cooling water is supplied to and discharged from the pair of manifold holes 15c between the back surfaces of the separators 5b and 5c of the adjacent single cells 20 facing with each other.

As shown in FIG. 8C, on a frame member assembled surface 9 corresponding to the surface with the cathode electrode 1c formed thereon in the frame member 2, a gasket 3c, which includes the manifold holes 15a for oxidizing agent gas and oxidizing agent gas flow passages (gas flow passages) 2y and surrounds the entire area that allows the oxidizing agent gas to pass on the cathode electrode 1c so as to form the manifold for oxidizing agent gas, is formed in a manner so as to form a semi-circular shaped convex portion in its cross section, with a rectangular frame shape on the plan view. Moreover, as shown in FIG. 8B, on a frame member assembled surface 9 corresponding to the surface with the anode electrode 1b formed thereon in the frame member 2, a gasket 3b, which includes the manifold holes 15b for fuel gas and fuel gas flow passages (gas flow passages) 2x and surrounds the entire area that allows the fuel gas to pass on the anode electrode 1b so as to form the manifold for fuel gas, is formed in a manner so as to form a semi-circular shaped convex portion in its cross section, with a rectangular frame shape on the plan view. Moreover, the gaskets 3b and 3c are formed so as to be separated from the areas (manifolds) that allow the respective gases to pass, and allowed to surround only the manifold hole 15c for cooling water. Therefore, in the assembled state of the single cells, the gaskets 3b and 3c are respectively inserted into the concave sections 5d and 5e on the separator assembled surface 10 of the separators 5b and 5c, and placed in contact therewith to be elastically deformed so that leakages of the fuel gas and the oxidizing agent gas as well as leakage of the cooling water are prevented independently on the cathode side and anode side respectively (see FIGS. 4D, 4H, etc.).

Figure 9A:
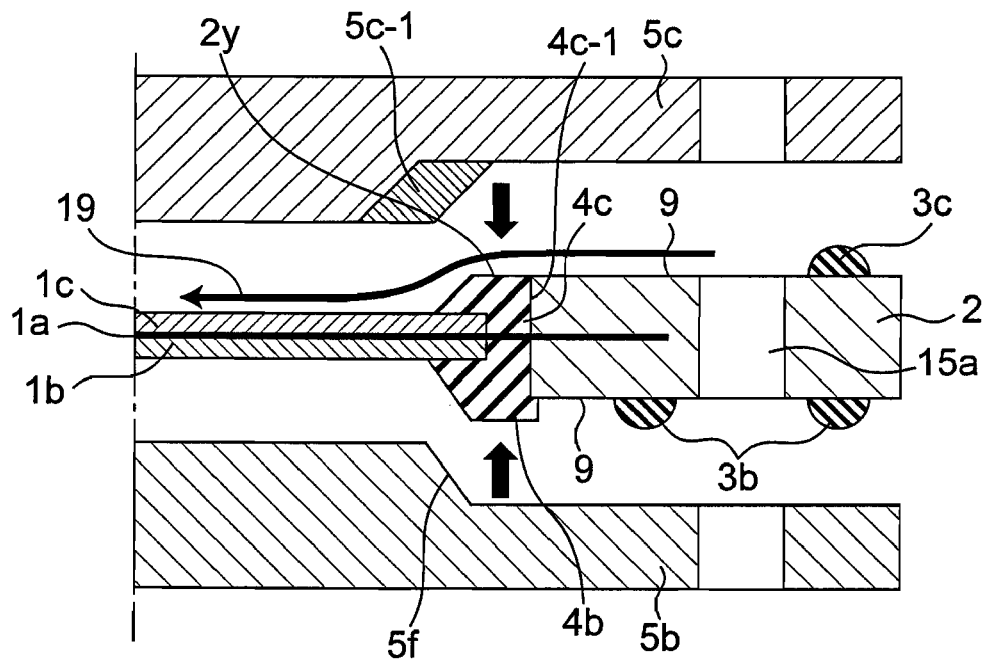
FIG. 9A is a schematic cross-sectional view that shows a gas flow passage portion of the single cell prior to an assembling process, in accordance with the first embodiment.
Figure 9B:
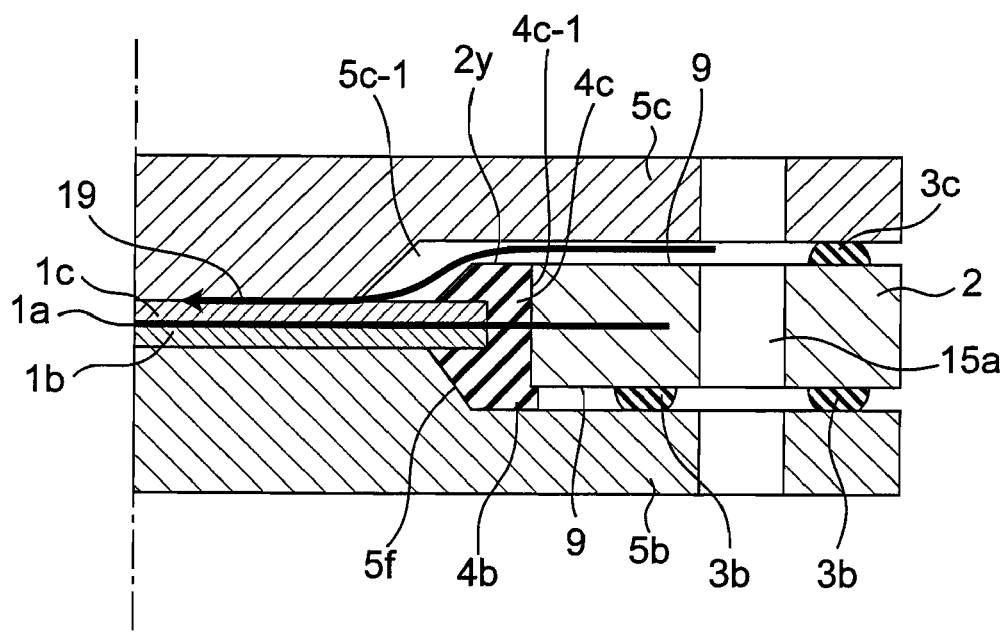
FIG. 9B is a schematic cross-sectional view that shows a gas flow passage portion of the single cell after the assembling process, in accordance with the first embodiment.

Moreover, on the surface of the cathode electrode 1c of the MEA (membrane-electrode assembly) 15, as shown in FIGS. 9A and 9B, a gas flow passage 19 from the manifold hole 15a for oxidizing agent gas toward the cathode electrode 1c side is designed in such a manner that a gas flow passage portion 4c-1 that is one portion of the frame shaped cathode-side elastic member 4c and corresponds to the gas flow passage portion 2y of the frame member 2 is made lower to the same level as the thickness of the frame member 2, and with respect to a gas flow passage portion of the cathode-side separator 5c that faces the gas flow passage portion 4c-1 of the cathode-side elastic member 4c, a gas flow passage concave section 5c-1 (a concave section corresponding to a parallelogram shaped portion with slanting lines indicated by reference numeral 5c-1 in FIG. 8A, and this portion with the slanting lines actually forms a space) is formed. Consequently, in the assembled state of the single cells, a space used for supplying gas is positively formed between the gas flow passage portion 4c-1 of the cathode-side elastic member 4c and the cathode-side separator 5c. Here, preferably, no cathode-side rib 4e is placed near the gas flow passage portion 4c-1 of the cathode-side elastic member 4c so as to ensure the gas flow passage.

Moreover, the same structure is formed also on the anode side, and on the surface of the anode electrode 1b of the MEA (membrane-electrode assembly) 15, a gas flow passage 19 from the manifold hole 15b for fuel gas toward the anode electrode 1b side is designed in such a manner that a gas flow passage portion 4b-1 (see FIG. 8B, the portion similar to the gas flow passage portion 4c-1 of FIGS. 8A and 8C) that is one portion of the frame shaped anode-side elastic member 4b and corresponds to the gas flow passage portion 2x of the frame member 2 is made lower to the same level as the thickness of the frame member 2, and on a gas flow passage portion of the anode-side separator 5b that faces the gas flow passage portion 4b-1 of the anode-side elastic member 4b, a gas flow passage concave section 5b-1 (not shown, the same as the gas flow passage concave section 5c-1 of FIG. 8A) is formed. Consequently, in the assembled state of the single cells, a space used for supplying gas is positively formed between the gas flow passage portion 4b-1 of the anode-side elastic member 4b and the cathode-side separator 5b. Here, preferably, no anode-side rib 4d is placed near the gas flow passage portion 4b-1 of the cathode-side elastic member 4b so as to ensure the gas flow passage.

Figure 8D:
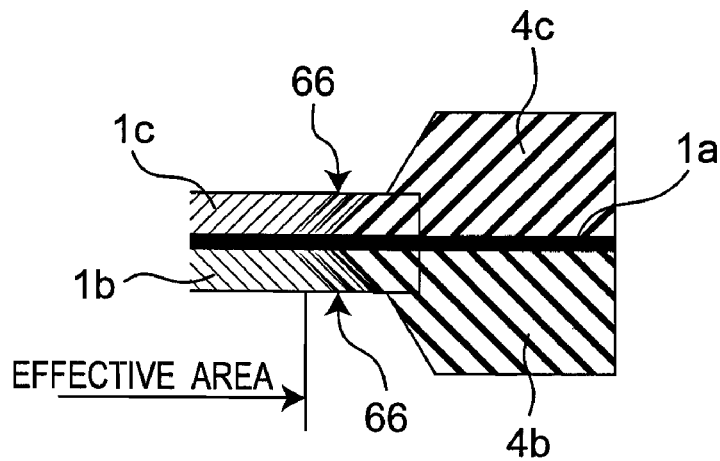
FIG. 8D is a partially enlarged drawing of the frame member, which explains that a thermoplastic resin is used as an elastic member.

With respect to the material for the elastic members 4b, 4c and the ribs 4d, 4e, for example, a thermoplastic resin elastomer is preferably used. The reason for this is explained as follows: if a thermoplastic resin was used as the elastic members 4b and 4c, the electrodes 1b and 1c would be impregnated with the thermoplastic resin to the inside thereof, because of its high flowability (see arrow 66), and this might make the effective area of each of the portions of the electrodes 1b and 1c smaller (see FIG. 8D). In contrast, in the case when a thermoplastic resin is used for the elastic members 4b and 4c as in the present embodiment, when, upon molding, the flowing fused resin is placed in contact with the electrodes 1b and 1c, it is quickly cooled and solidified so that the insides of the electrodes 1b and 1c are not impregnated with the resin; thus, no adverse effects are given to the effective area of the portion of each of the electrodes 1b and 1c, and it becomes possible to form a precise seal (in other words, a seal having a desired shape providing a superior transferring property) that matches the shape of the joining portions between the frame member 2 and the electrodes 1b and 1c by utilizing the molding pressure.

Examples of specific materials for the elastic members, ribs and gaskets include M3800, which is a high hardness product of MILASTOMER (registered trademark) made by Mitsui Chemicals, Inc., and one kind of olefin-based thermoplastic resin elastomer. Here, with respect to the elastic members and ribs, conditions for allowing them to have respective elastic deformations are given by the elasticity of A50 to A90 or D37 to D60, defined by JIS K 6253 (ISO 7619).

Specific examples of the material for the frame member 2 include R-250G or R-350G made by Prime Polymer Co., Ltd., and with respect to the separators 5b and 5c, a metal material obtained by surface-treating metal such as stainless steel (SUS) with gold plating or a metal material obtained by surface-treating titanium with gold plating may be used, and specific examples of the materials for the separators 5b and 5c include a resin impregnated graphite plate (glassy carbon made by Tokai Carbon Co., Ltd.) having an outside dimension of 120 mm×120 mm and a thickness of 3.0 mm. Here, in particular, with respect to the material for use in automobiles, a metal separator or the like, formed by subjecting stainless steel (SUS) to a surface treatment, may be preferably used.

Figure 8E:
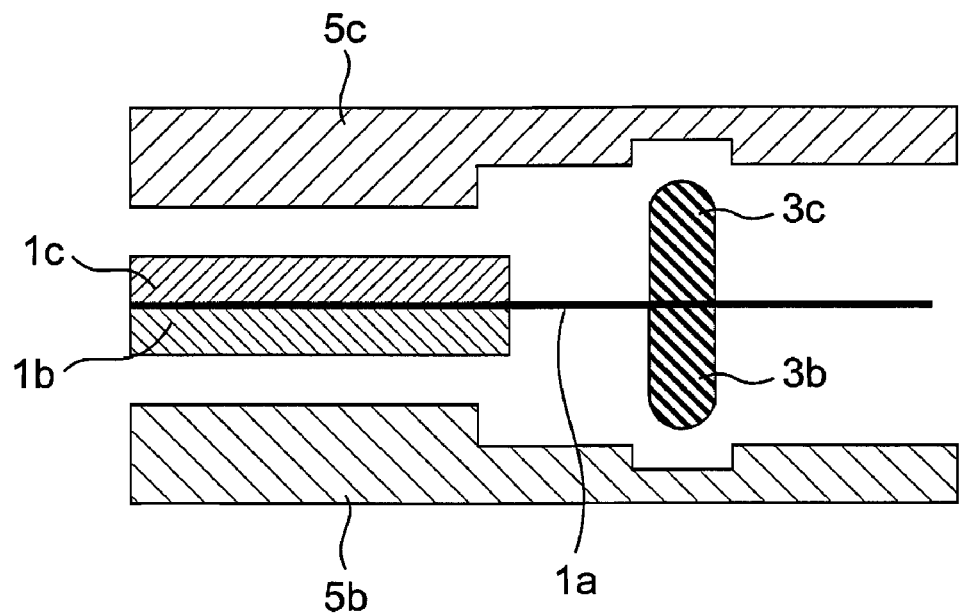
FIG. 8E is a schematic cross-sectional view that shows a single cell of a fuel cell stack prior to an assembling process in the case when two gaskets are directly placed on a polymer electrolyte membrane without using a frame member, and is used for explaining a problem that is caused when no frame member is adopted.
Figure 8F:
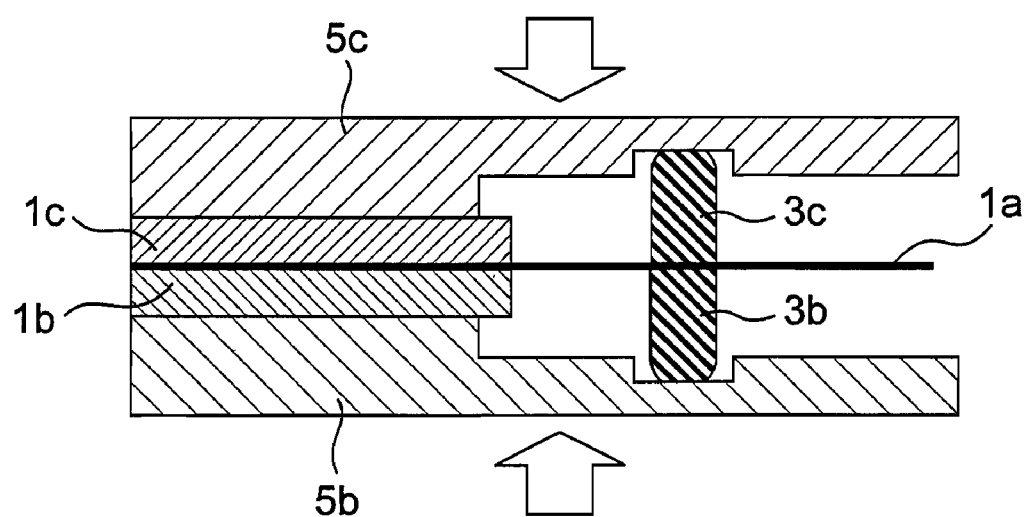
FIG. 8F is a schematic cross-sectional view that shows an initial state after assembling the single cell of FIG. 8E.
Figure 8G:
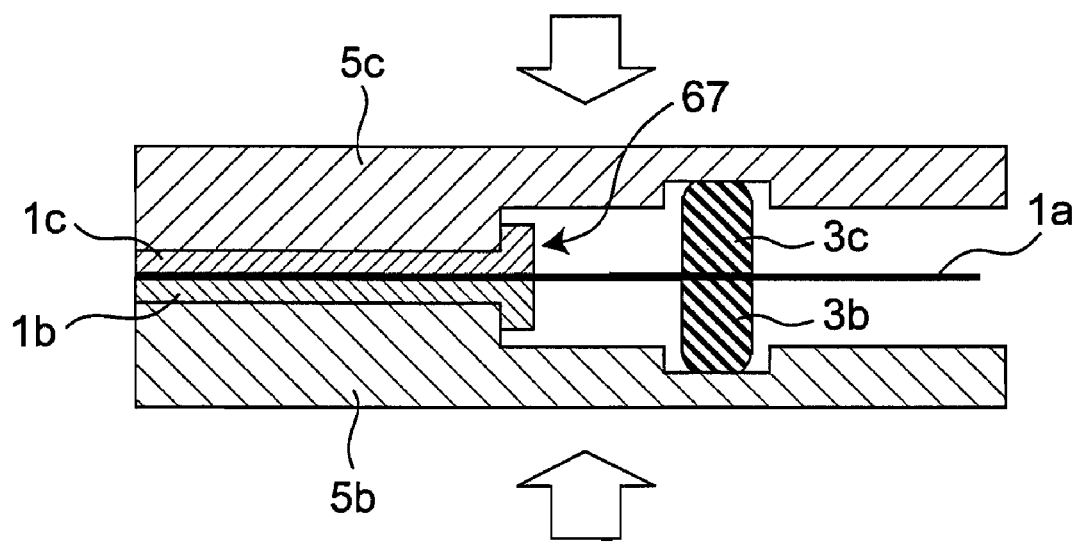
FIG. 8G is a schematic cross-sectional view that shows a state after the assembled single cell of FIG. 8E has been used for a long time.
Figure 8H:
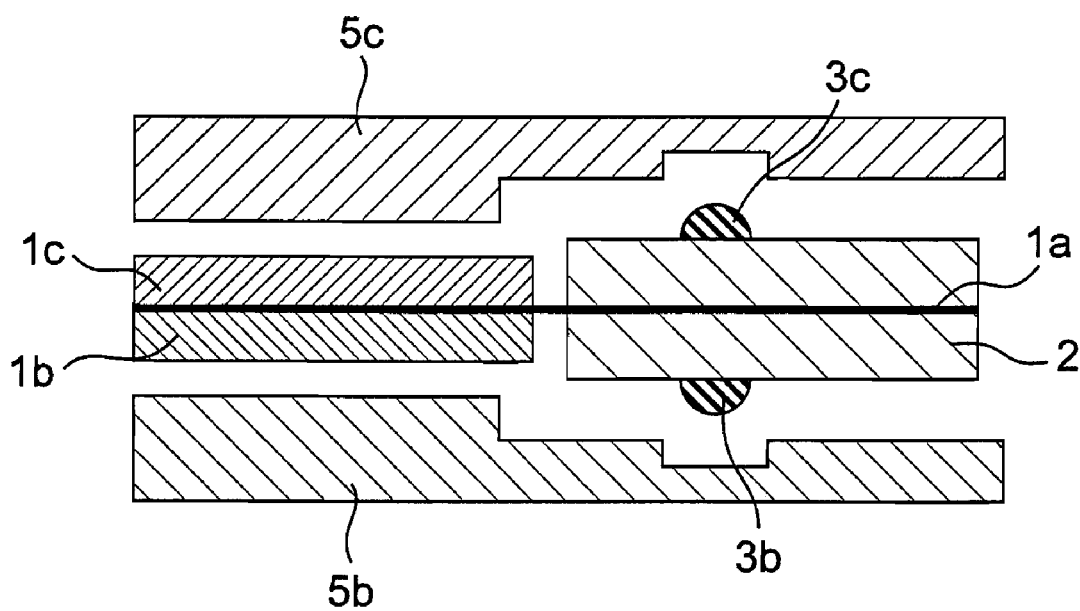
FIG. 8H is a schematic cross-sectional view that shows a state prior to an assembling process of the single cell of the fuel cell stack where a frame member is used.
Figure 8I:
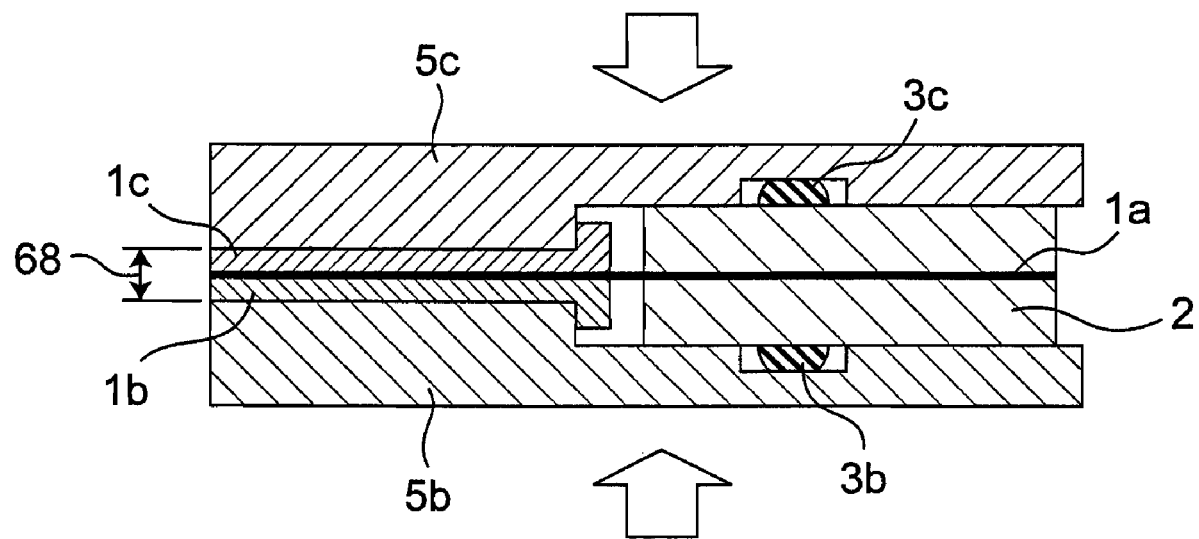
FIG. 8I is a schematic cross-sectional view that shows an initial state and a state after a long-term use of the assembled single cell shown in FIG. 8H.

With respect to the effects obtained by the presence of the frame member 2, in addition to the effect by which the manifolds are formed, the handling of the parts is made easier, and the separators 5b and 5c can be contact-stopped by the frame member 2; thus, the contact pressure between the separators 5b, 5c and the electrodes 1b, 1c can be optimally maintained. For example, in the case when, as shown in FIG. 8E, the gaskets 3b and 3c are directly placed on the polymer electrolyte membrane 1a without using the frame member 2, since the electrodes 1b and 1c are soft, the gaskets 3b and 3c have become squashed after a long-term use as shown in FIG. 8F (initial state) and FIG. 8G (after a long-term use) so that the gap dimension between the separators 5b and 5c is gradually narrowed to make the separators 5b and 5c come into contact with the electrodes 1b and 1c with a higher contacting force (see arrow 67 in the drawing). At this time, as shown in FIGS. 8H and 8I, the separators 5b and 5c are placed in contact with the frame member 2 to be stopped therein so that the gap dimension 68 between the separators 5b and 5c can be maintained stably with respect to the long-term compressing load.

When, upon assembling the single cells 20, the separators 5b and 5c are stacked on a membrane-electrode-frame assembly 15, the elastic members 4b and 4c and the ribs 4d and 4e are respectively compressed by the separators 5b and 5c, as shown in FIGS. 3B, 4G and 4H. As a result, since the polymer electrolyte membrane 1a is pressed along the thickness direction of the polymer electrolyte membrane 1a by compressing forces of the elastic members 4b and 4c, the gap 12 (see FIG. 3A) between the elastic members 4b, 4c and the polymer electrolyte membrane 1a is positively sealed by this pressing force and the elastic forces of the elastic members 4b and 4c, even when the polymer electrolyte membrane 1a and the elastic members 4b and 4c are not bonded to each other. Moreover, by utilizing the elastic deformations of the elastic members 4b, 4c and the ribs 4d, 4e between the separators 5b, 5c and the frame member 2, a gap 6 (see FIG. 3D) between each of the outer edges of the anode electrode 1b and the cathode electrode 1c and each of the inner edges 2b, 2c of the frame member 2 can be made greatly smaller in comparison with those of the conventional example so that the space of the gap 6 can be made greatly smaller or the gap 6 can be eliminated.

Here, in accordance with the first embodiment, the anode-side elastic member 4b having a frame shape on the plan view and the cathode-side elastic member 4c having a frame shape on the plan view, as well as a number of anode-side ribs 4d and cathode-side ribs 4e placed at predetermined intervals, are respectively placed on the edge portion inside the frame 2 that holds the polymer electrolyte membrane 1a or the like; therefore, upon assembling the single cells 20, the anode-side elastic member 4b and each of the anode-side ribs 4b are elastically deformed respectively in a direction orthogonal to the thickness direction of the membrane-electrode-frame assembly 15, with the elastically deformed portions being respectively inserted into the anode-side concave section (compressed volume releasing section) 4f that is a space formed between the adjacent anode-side ribs 4d, so that the elastically deformed anode-side elastic member 4b and the elastically deformed anode-side ribs 4d are virtually continuously placed in tight contact in the gap between the frame member 2 and the anode-side separator 5b to seal the gap, thereby making it possible to exert a sealing effect. Moreover, on the cathode side also, upon assembling the single cells 20, the cathode-side elastic member 4c and each of the cathode-side ribs 4c are elastically deformed respectively between the frame member 2 and the cathode-side separator 5c, with the elastically deformed portions being respectively inserted into the cathode-side concave section (compressed volume releasing section) 4g that is a space formed between the adjacent cathode-side ribs 4d, so that the elastically deformed cathode-side elastic member 4c and the elastically deformed cathode side ribs 4e are virtually continuously placed in tight contact in the gap between the frame member 2 and the cathode-side separator 5c to seal the gap, thereby making it possible to exert a sealing effect.

As a result, the frame member 2 and the anode-side separator 5b as well as the cathode-side separator 4c are respectively placed in tight contact and sealed with each other by the elastically deformed anode-side elastic member 4b and the elastically deformed anode-side ribs 4d as well as by the elastically deformed cathode-side elastic member 4c and the elastically deformed cathode-side ribs 4e so that it becomes possible to effectively restrain a cross-leak phenomenon that occurs through the gap 12 (see FIG. 3A) between the polymer electrolyte membrane 1a and the frame member 2 (a phenomenon in which a cross-leak as indicated by an arrow 18 in FIG. 8A occurs in the conventional example), and also to prevent a short-circuiting flow of a reducing agent gas 11a along the edge portion of the frame member 2 and a short-circuiting flow of an oxidizing agent gas 11b along the edge portion of the frame member 2 (see FIG. 3A) respectively; thus, it becomes possible to further improve the rates of utilization of the reducing agent gas 11a and the oxidizing agent gas 11b, respectively, and consequently to further enhance the performance of a polymer electrolyte fuel cell.

Second Embodiment

Figure 5A:
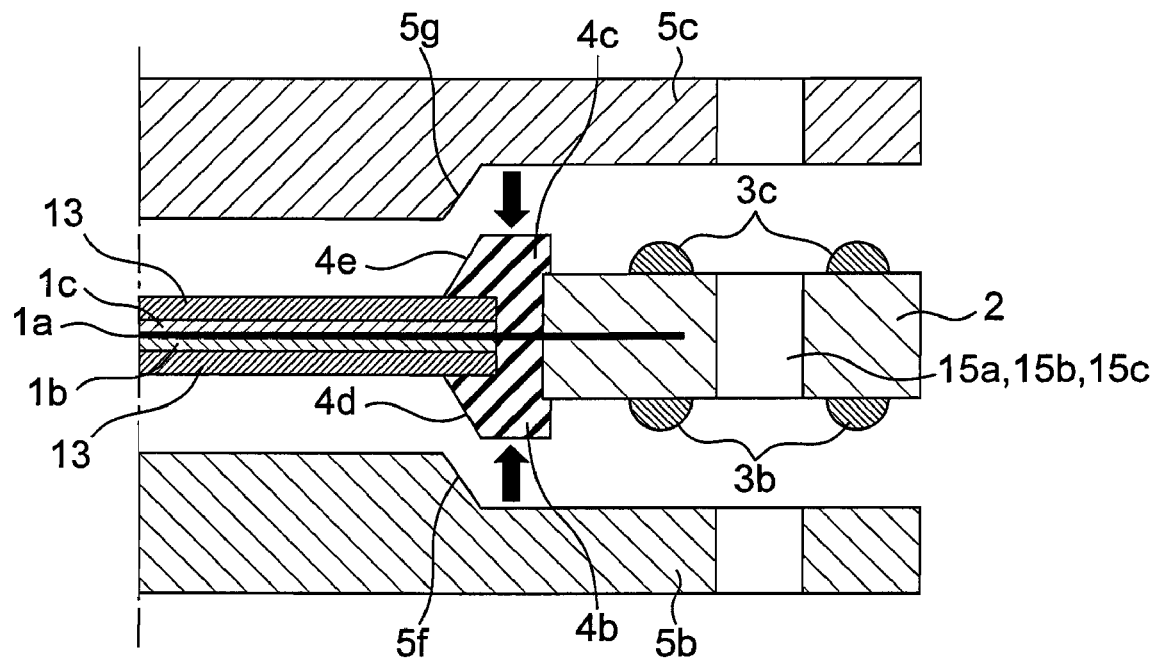
FIG. 5A is a schematic cross-sectional view showing a single cell of the stack for a fuel cell prior to the assembling process, in accordance with a second embodiment of the present invention.

FIG. 5A is a schematic cross-sectional view that schematically shows a structure of single cells of a fuel cell provided with a stack for a fuel cell in accordance with a second embodiment of the present invention.

In the second embodiment, the aforementioned single cell of the first embodiment is designed in such a manner that the inclined surface 5f of the anode-side separator 5b and the inclined surface 5g of the cathode-side separator 5c are not formed into an entirely circumferential frame shape on the plan view, but formed as a partial portion. Moreover, in the first embodiment, the anode-side inclined surface and the cathode-side inclined surface of the elastic members 4b and 4c are prepared as the bottom surface of the anode-side concave section 4f and the bottom surface of the cathode-side concave section 4g; however, not limited by this structure, these may be prepared as the surface of the anode-side rib 4d and the surface of the cathode-side rib 4e. Furthermore, not limited to the structure in which the bottom surface of the anode-side concave section 4f and the bottom surface of the cathode side concave section concave section 4g, or the surface of the anode-side rib 4d and the surface of the cathode side rib 4e are virtually placed in parallel with the inclined surface s 5f and 5g of the separators 5b and 5c, the inclined angles may be slightly different from each other, as long as, in short, the above-mentioned tight contact sealing effect, obtained by the elastic deformations of the anode-side rib 4d and the cathode-side rib 4e, is exerted upon assembling the single cells.

With this arrangement, upon stacking the separators 5b and 5c on the membrane-electrode-frame assembly 15, a tightly contacting and sealing process is carried out stably not only on the upper surfaces of the elastic members 4b and 4c, but also on the inclined surface sides of the elastic members 4b and 4c by using the anode-side rib 4d and the cathode-side rib 4e, so that it becomes possible to further improve the blocking properties for the reducing agent gas 11a and the oxidizing agent gas 11b, and also to allow these inclined surfaces to exert a guiding function for making easier the relative positioning process between the membrane-electrode-frame assembly 15 and the separators 5b, 5c, upon laminating and assembling the single cells; thus, it becomes possible to improve the assembling property.

Modified Examples

The present invention is not intended to be limited by the above-mentioned embodiments, and various modified modes may be carried out.

Figure 5B:
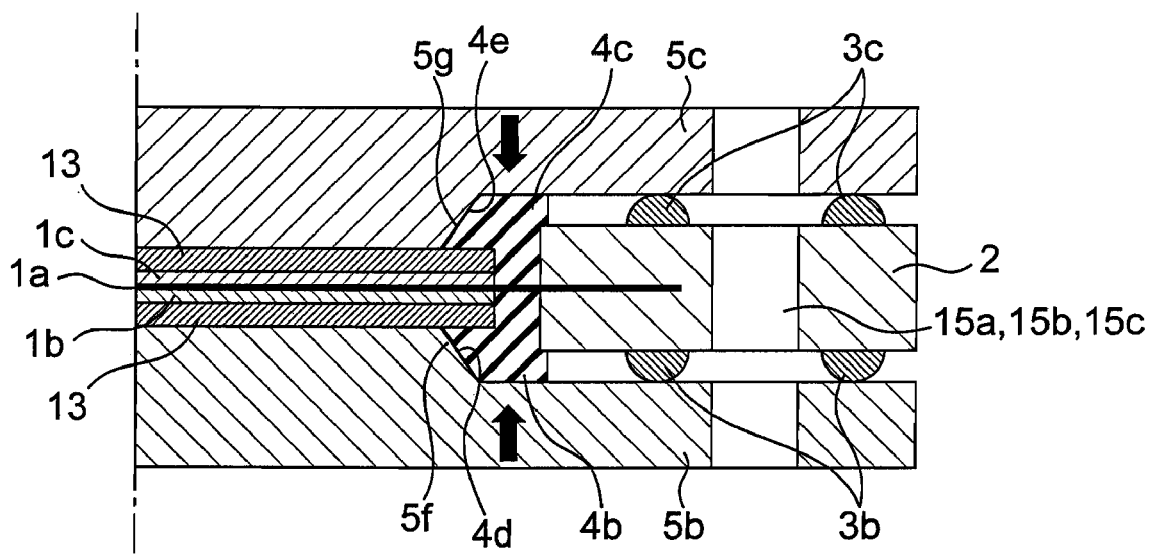
FIG. 5B is a schematic cross-sectional view showing the single cell after the assembling process of FIG. 5A.

For example, in the polymer electrolyte membrane 1a of each of the embodiments, in addition to the integrally-molded structure by using the elastic members 4b and 4c, one more reinforcing membrane 13 (see FIGS. 5A and 5B) may be placed to protect the anode electrode 1b and the cathode electrode 1c, and the same effects can be obtained.

Moreover, another modified example may be used in which in each of the embodiments, at portions where the anode-side elastic member 4b and the cathode-side elastic member 4c are placed, since the same sealing effect for gases as that of the gaskets 3b and 3c is obtained by the elastically deforming effect thereof, the reducing agent gas 11a and the oxidizing agent gas 11b are respectively sealed so that no gaskets 3b and 3c are required on the outer circumferential portion.

Figure 6:
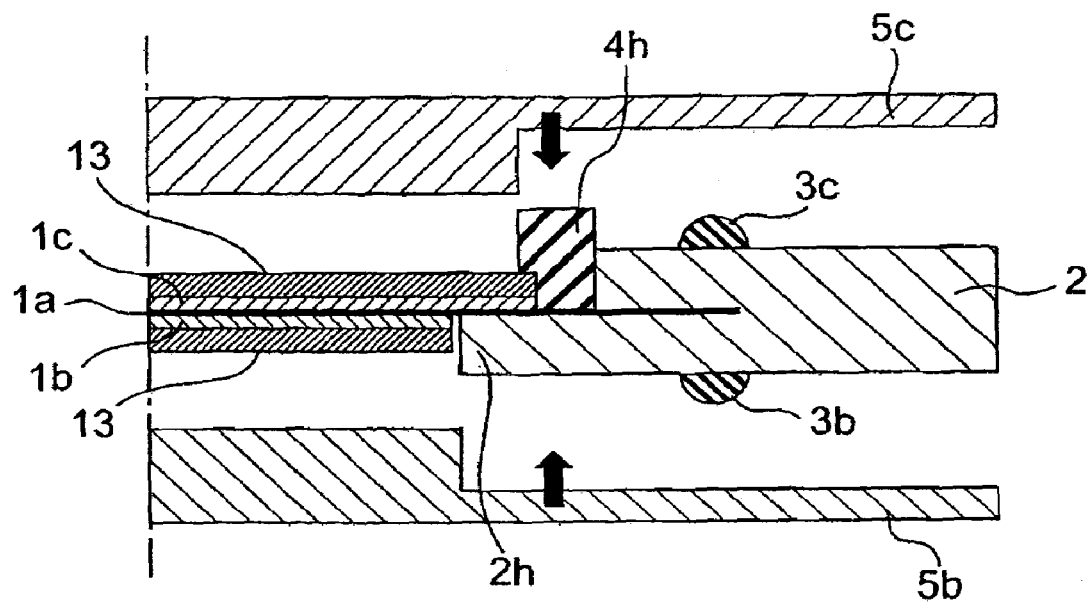
FIG. 6 is a schematic cross-sectional view showing a single cell of the stack for a fuel cell prior to an assembling process in accordance with a modified example of the first or second embodiment.

Still another modified example may be used in which in each of the embodiments, as shown in FIG. 6, an elastic member 4h that is the same as the elastic member 4b or 4c is placed only on one of the sides of the anode-side frame assembled surface 9 and the cathode-side frame assembled surface 9 of the frame member 2 partially or along the entire circumference, and on the other of the anode-side frame assembled surface 9 and the cathode-side frame assembled surface 9, an extended portion 2h, formed by extending the frame member 2 toward the center in the inner edge direction, may be placed so as to receive a compressing pressure from the elastic member 4h upon stacking the separators 5b and 5c. In this manner, even by the use of only one of the elastic members 4h, the corresponding effect can be obtained, and since it is only necessary to place the elastic member 4h only on one of the sides of the anode-side frame assembled surface 9 and the cathode-side frame assembled surface 9 of the membrane-electrode-frame assembly, the manufacturing processes become easier. In this case, as shown in FIG. 6, in order to form the extended portion 2h, the position of the outer edge of the cathode electrode 1c is set on the inner side from the position of the outer edge of the anode electrode 1b.

Additionally, in this still another modified example, another modified example or the embodiments (except for those of FIGS. 5A and 5B), no reinforcing membrane 13 is required.

Figure 7A:
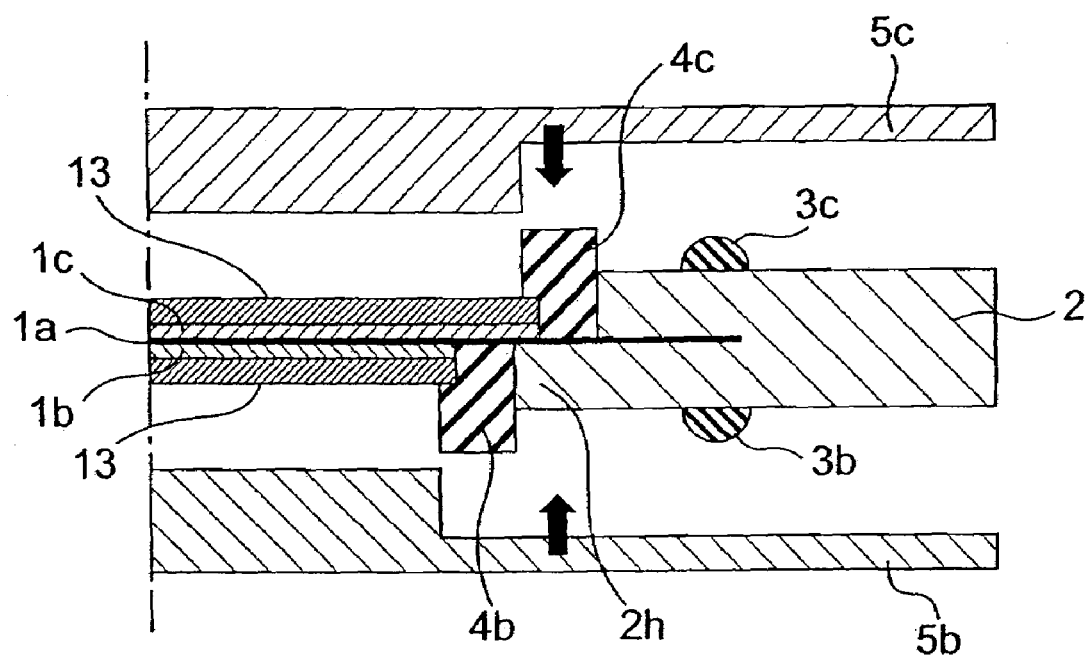
FIG. 7A is a schematic cross-sectional view showing a single cell of the stack for a fuel cell prior to an assembling process, in accordance with another modified example of the first or second embodiment.

Moreover, still another modified example may be used in which in each of the embodiments, as shown in FIG. 7A, by mutually shifting the positions of the elastic members 4b and 4c on the above-mentioned one side with respect to the frame member assembled surface 9 on the anode side and the frame member assembled surface 9 on the cathode side of the frame member 2 in the membrane-electrode-frame assembly, the molding pressure at the time of the integrally molding process can be easily received so that the deformation resistant strength of each of the elastic members 4b and 4c against a molding pressure at the time of the molding process can be made smaller; thus, it becomes possible to enhance the degree of freedom in designing the single cell 20. In this case also, the elastic members 4b and 4c may be placed partially or along the entire circumference. In this case also, as shown in FIG. 7A, in order to form the extended portion 2h, the position of the outer edge of the cathode electrode 1c is set on the inner side from the position of the outer edge of the anode electrode 1b.

Figure 7B:
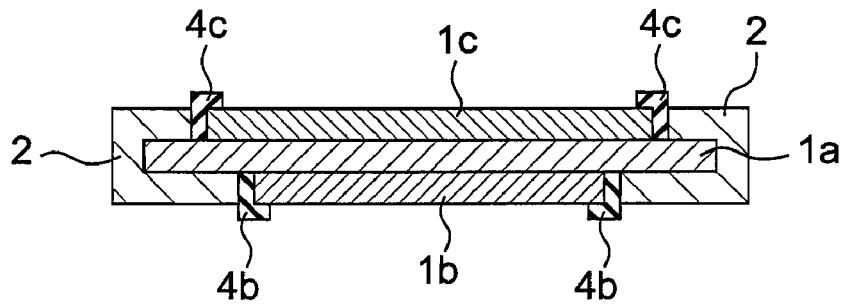
FIG. 7B is a schematic cross-sectional view showing a single cell of the stack for a fuel cell after the assembling process, in accordance with still another modified example of the first or second embodiment.
Figure 7C:
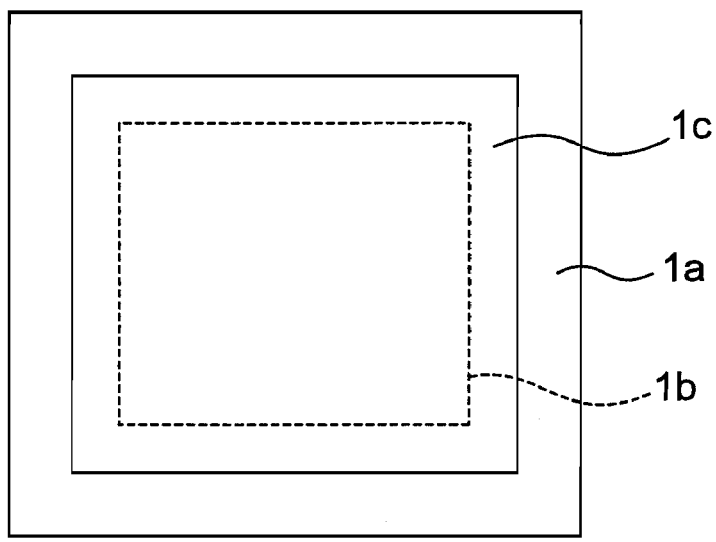
FIG. 7C is a schematic plan view showing a membrane-electrode-frame assembly of a single cell of the stack for a fuel cell in accordance with the modified example of FIG. 7B.
Figure 7D:
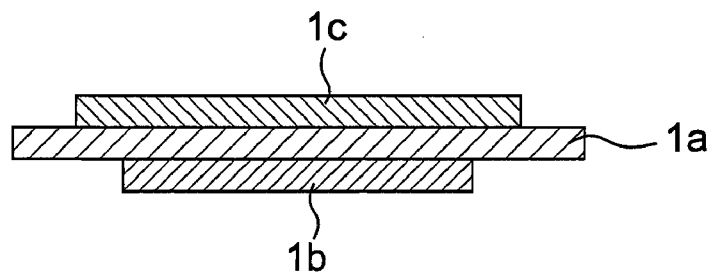
FIG. 7D is a schematic cross-sectional view showing the membrane-electrode-frame assembly of the single cell of the stack for a fuel cell in accordance with the modified example of FIG. 7B.

A specific example is proposed in which, as shown in FIG. 7A, in order to shift the positions of the elastic members 4b and 4c by placing the position of the outer edge of the cathode electrode 1c on the inner side from the position of the outer edge of the anode electrode 1b, the sizes of the anode electrode 1b and the cathode electrodes 1c may be made different from each other, as shown in FIGS. 7B to 7D. For example, a square shaped cathode electrode 1c may be made greater than a square shaped anode electrode 1b.

Each of the structures of FIGS. 7B to 7D provides a typical basic example of another modified example shown in FIG. 7A, and has a shape in which the elastic members 4b and 4c are simply placed on the entire circumference of the frame member 2 respectively, which provides a simplified structure.

Figure 7E:
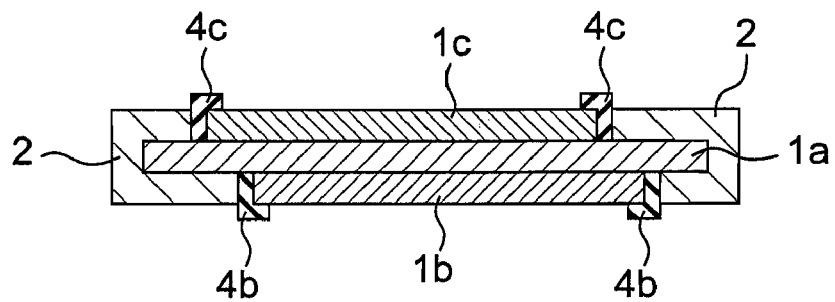
FIG. 7E is a schematic cross-sectional view showing a single cell of the stack for a fuel cell after the assembling process in accordance with still another modified example of the first or second embodiment.
Figure 7F:
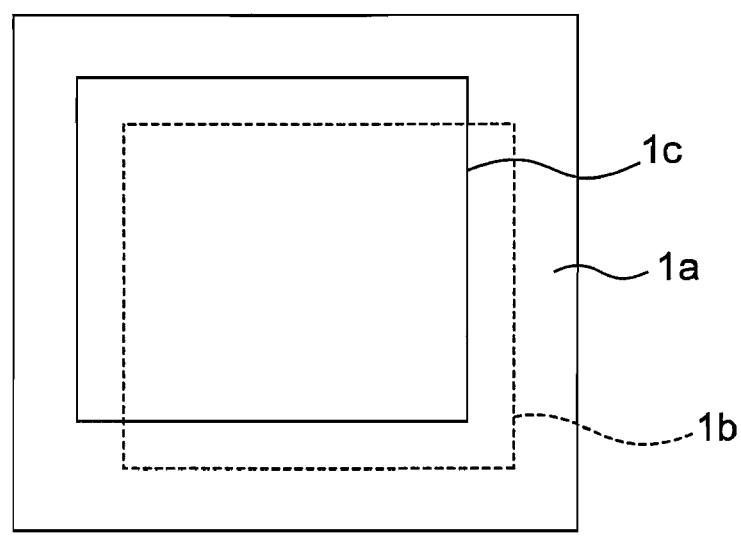
FIG. 7F is a schematic plan view showing a membrane-electrode-frame assembly of a single cell of the stack for a fuel cell in accordance with the modified example of FIG. 7E.
Figure 7G:
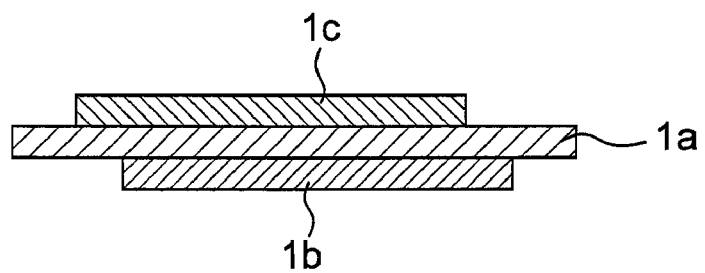
FIG. 7G is a schematic cross-sectional view showing the membrane-electrode-frame assembly of a single cell of the stack for a fuel cell in accordance with the modified example of FIG. 7E.

Moreover, another specific example is proposed in which, as shown in FIG. 7A, in order to place the position of the outer edge of the cathode electrode 1c on the inner side from the outer edge of the anode electrode 1b so that the positions of the elastic members 4b and 4c are shifted from each other, although the sizes of the anode electrode 1b and the cathode electrode 1c are the same as shown in FIGS. 7E to 7G, the layout positions thereof may be made different from each other. For example, a square shaped cathode electrode 1c and a square shaped anode electrode 1b having the same size may be shifted in their positions in a diagonal direction in FIG. 7F.

In accordance with the structures of FIGS. 7E to 7G, the following effects are obtained. That is, in contrast to the structures of FIGS. 7B to 7D in which the sizes of the anode electrode 1b and the cathode electrode 1c are made different, the structures of FIGS. 7E to 7G only require, for example, one kind of a pressing mold so that the manufacturing process of electrodes can be made easier, with the circumferential lengths of the elastic members 4b and 4c being made equal to each other, thereby making it possible to improve the moldability.

Figure 7H:
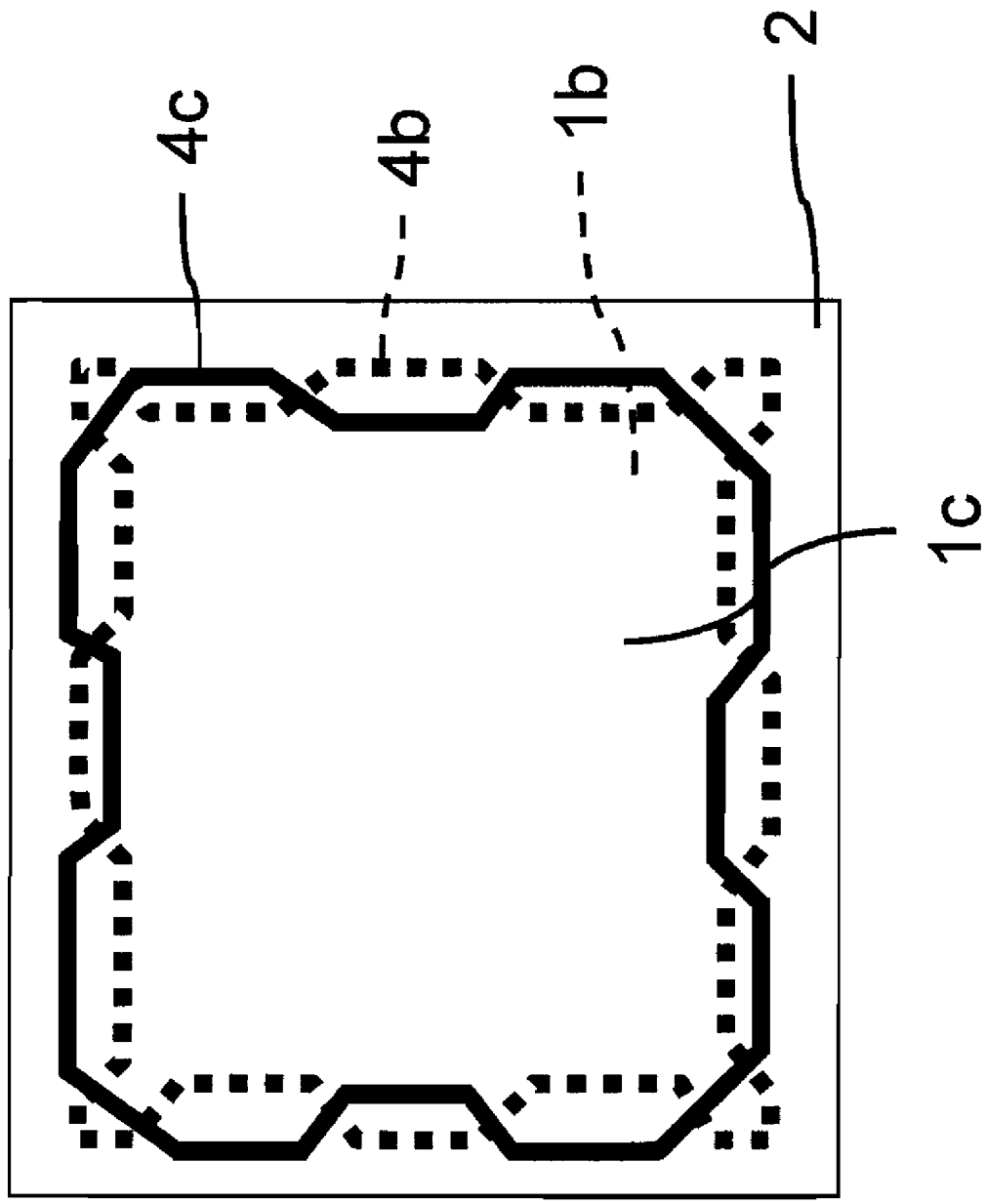
FIG. 7H is a schematic plan view showing a membrane-electrode-frame assembly of a single cell of the stack for a fuel cell prior to an assembling process in accordance with still another modified example of the first or second embodiment.
Figure 7I:
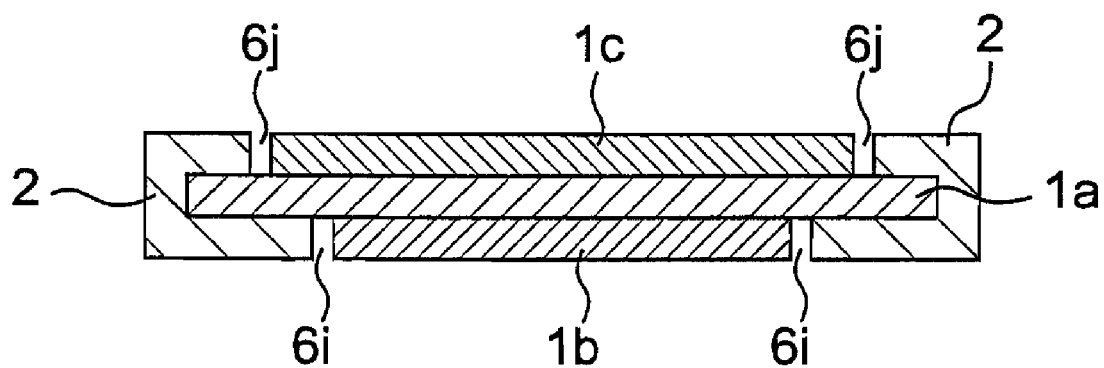
FIG. 7I is a schematic cross-sectional view showing a single cell of the stack for a fuel cell prior to an assembling process as well as prior to a molding process of an elastic member in accordance with the modified example of FIG. 7H.
Figure 7J:
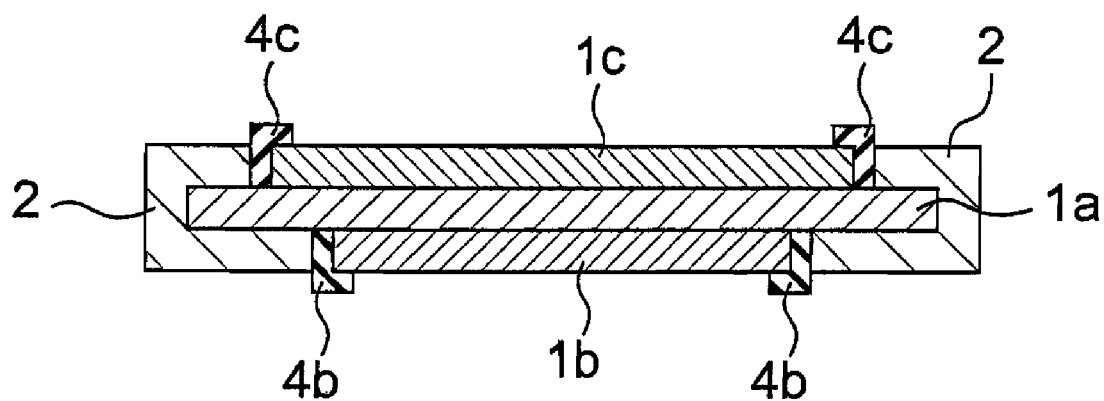
FIG. 7J is a schematic cross-sectional view showing the single cell of the stack for a fuel cell after the assembling process (after the elastic member molding process) in accordance with the modified example of FIG. 7H.

Moreover, another specific example is proposed in which in order to shift the position of the elastic member 4c outside the cathode electrode 1c and the position of the elastic member 4b outside the anode electrode 1b as shown in FIG. 7A, the sizes of the anode electrode 1b and the cathode electrode 1c may be made different from each other, as shown in FIGS. 7H to 7J, with the respective shapes being formed not into quadrangular shapes, but into shapes, each having flange portions that partially extend alternately at outer edges of the anode electrode 1b and the cathode electrode 1c, while the layout positions of the elastic members 4b and 4c located on the outsides of the respective anode electrode 1b and the cathode electrode 1c may be formed not into a square shape, but into a zigzag shape along the outer edge of each of the electrodes 1b and 1c. For example, the cathode electrode 1c may be made greater than the anode electrode 1b, while the elastic member 4c placed along the outer edge of the cathode electrode 1c in a zigzag shape and the elastic member 4b placed along the outer edge of the anode electrode 1b in a zigzag shape are allowed to intersect with each other at predetermined intervals to be placed on the inner side and the outer side alternately. Here, FIG. 7I is a schematic cross-sectional view showing a single cell of the stack for a fuel cell prior to an assembling process as well as prior to a molding process of an elastic member, and in this drawing, a gap 6i used for forming the elastic member 4b and a gap 6j used for forming the elastic member are continuously formed into a frame shape. FIG. 7J is a schematic cross-sectional view showing a state in which the elastic members 4b and 4c are respectively molded and formed into the respective frame-shaped gaps 6i and 6j.

In accordance with the structures shown in FIGS. 7H to 7J, the centers of the anode electrode 1b and cathode electrode 1c can be made coincident with each other in comparison with the examples of FIGS. 7E to 7G so that the product can be well-balanced as a whole.

Figure 7K:
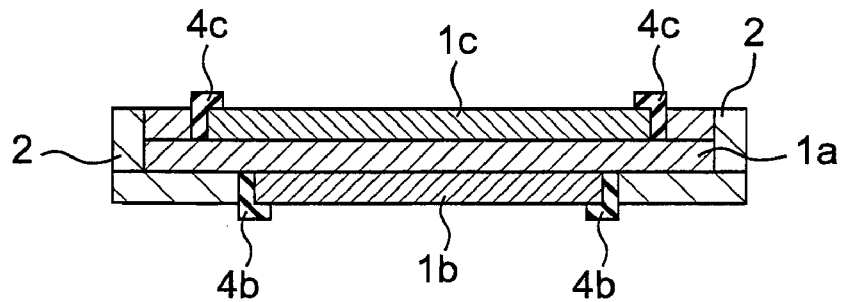
FIG. 7K is a schematic plan view showing a membrane-electrode-frame assembly of a single cell of the stack for a fuel cell after the assembling process in accordance with still another modified example of the first or second embodiment.
Figure 7L:
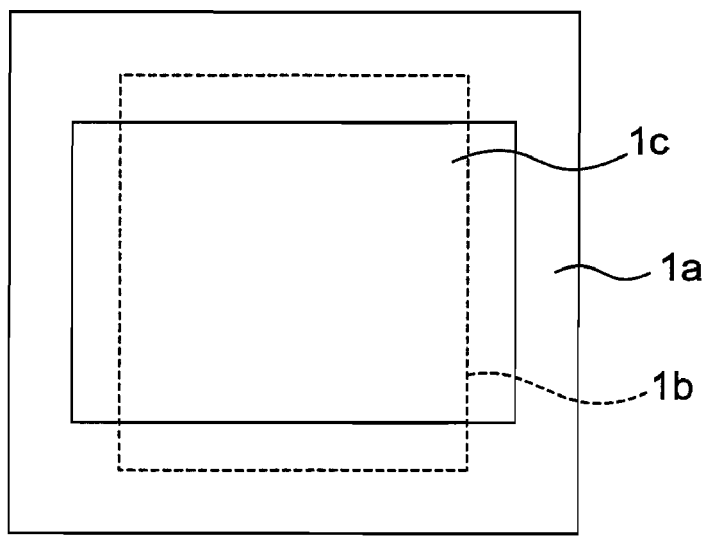
FIG. 7L is a schematic plan view showing a membrane-electrode-frame assembly of the single cell of the stack for a fuel cell in accordance with the modified example of FIG. 7K.
Figure 7M:
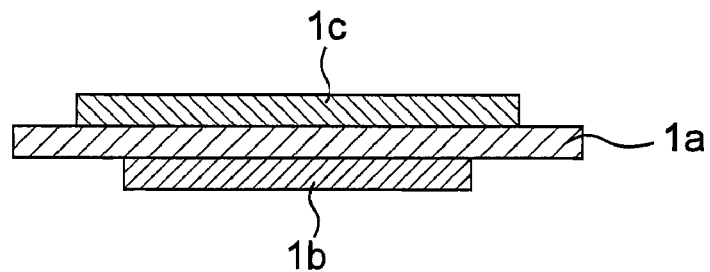
FIG. 7M is a schematic cross-sectional view showing the membrane-electrode-frame assembly of the single cell of the stack for a fuel cell in accordance with the modified example of FIG. 7K.

Furthermore, still another specific example is proposed in which in order to shift the position of the elastic member 4c outside the cathode electrode 1c and the position of the elastic member 4b outside the anode electrode 1b as shown in FIG. 7A, the sizes of the anode electrode 1b and the cathode electrode 1c may be made different from each other, as shown in FIGS. 7K to 7M, with the cathode electrode 1c being allowed to clearly protrude from the longer side (or the shorter side) of the anode electrode 1b.

As described above in various ways, by shifting the position of the elastic member 4b on the anode electrode 1b side and the position of the elastic member 4c on the cathode electrode 1c side, the molding pressure at the time of the integrally molding process can be easily received so that the deformation resistant strength of each of the elastic members 4b and 4c against the molding pressure at the time of the molding process can be made smaller and the deformation of the polymer electrolyte membrane 1a can be prevented, and the following description will discuss these effects in detail.

Figure 11A:
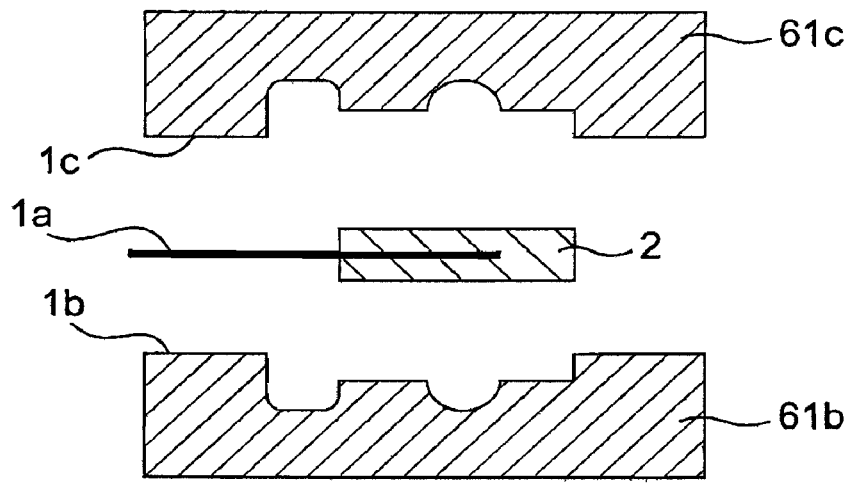
FIG. 11A is an explanatory view that shows processes prior to a mold clamping process upon molding a single cell of a stack for a fuel cell in the case when positions of an elastic member on an anode electrode side and an elastic member on a cathode electrode side are not shifted.
Figure 11B:
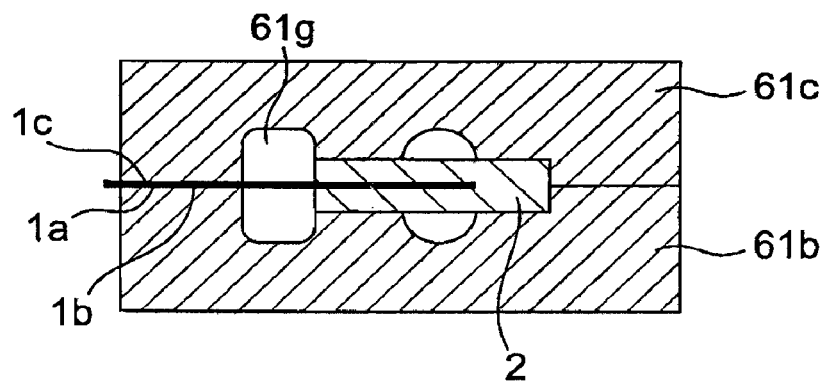
FIG. 11B is an explanatory view that shows processes during the mold clamping process when a single cell of a stack for a fuel cell is molded in FIG. 11A.
Figure 11C:
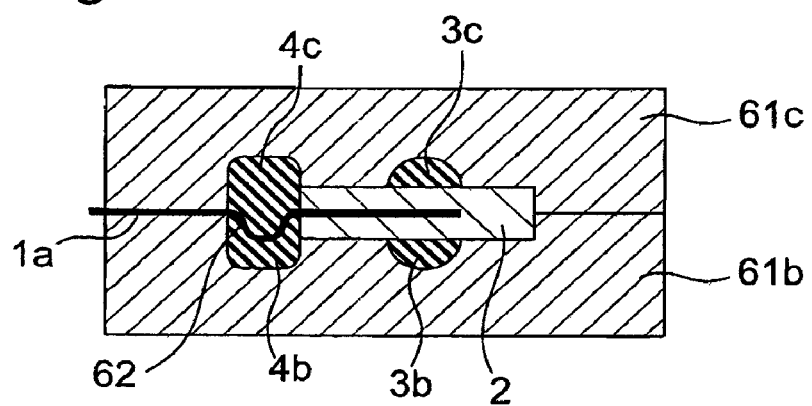
FIG. 11C is an explanatory view that shows a fused resin injecting process into molds upon molding a single cell of a stack for a fuel cell in FIG. 11A.

As shown in FIG. 11A, in the case when no shift is prepared between the positions of the elastic member 4b on the anode electrode side and the elastic member 4c on the cathode electrode side, an anode electrode 1b is placed in a mold 61b on the anode electrode side, with a cathode electrode 1c being placed in a mold 61c on the cathode electrode side, and the mold 61b on the anode electrode side and the mold 61c on the cathode electrode side are clamped as shown in FIG. 11B, with a frame member 2 and a polymer electrolyte membrane 1a being sandwiched between the mold 61b on the anode electrode side and the mold 61c on the cathode electrode side. Next, as shown in FIG. 11C, when fused resin is injected into the mold 61b on the anode electrode side and the mold 61c on the cathode electrode side thus clamped, the pressure of the fused resin is received only by the polymer electrolyte membrane 1a in a cavity 61g where the elastic members 4b and 4c face with each other. In this case, since the polymer electrolyte membrane 1a is insufficient in strength, the polymer electrolyte membrane 1a might be deformed by the pressure of the fused resin as indicated by reference numeral 62 in FIG. 11C.

Figure 11D:
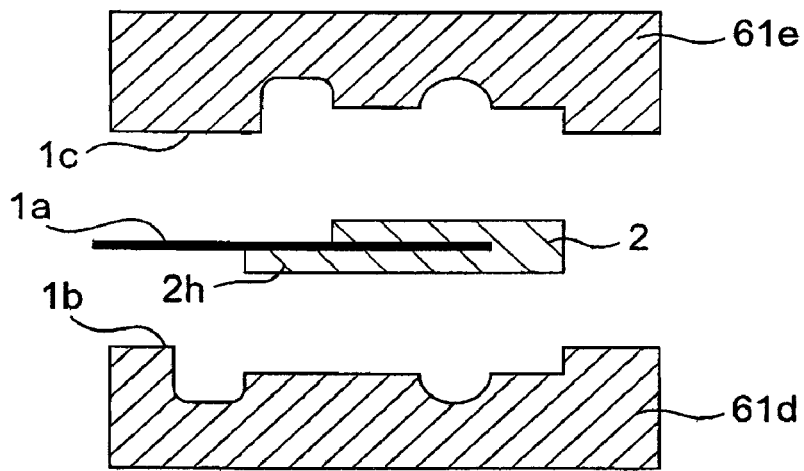
FIG. 11D is an explanatory view that shows processes prior to a mold clamping process upon molding a single cell of a stack for a fuel cell in the case when positions of an elastic member on an anode electrode side and an elastic member on a cathode electrode side are shifted.
Figure 11E:
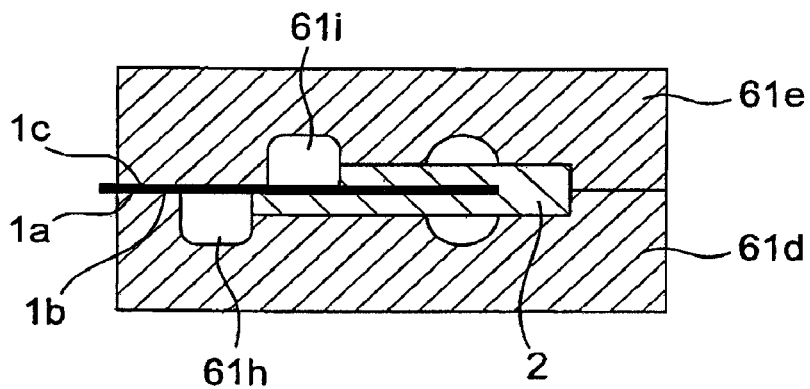
FIG. 11E is an explanatory view that shows processes during the mold clamping process when a single cell of a stack for a fuel cell is molded in FIG. 11D.
Figure 11F:
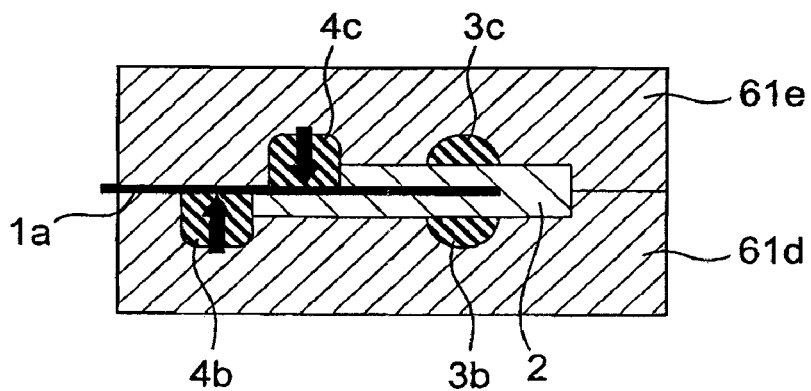
FIG. 11F is an explanatory view that shows a fused resin injecting process into molds upon molding a single cell of a stack for a fuel cell in FIG. 11D.
Figure 12:
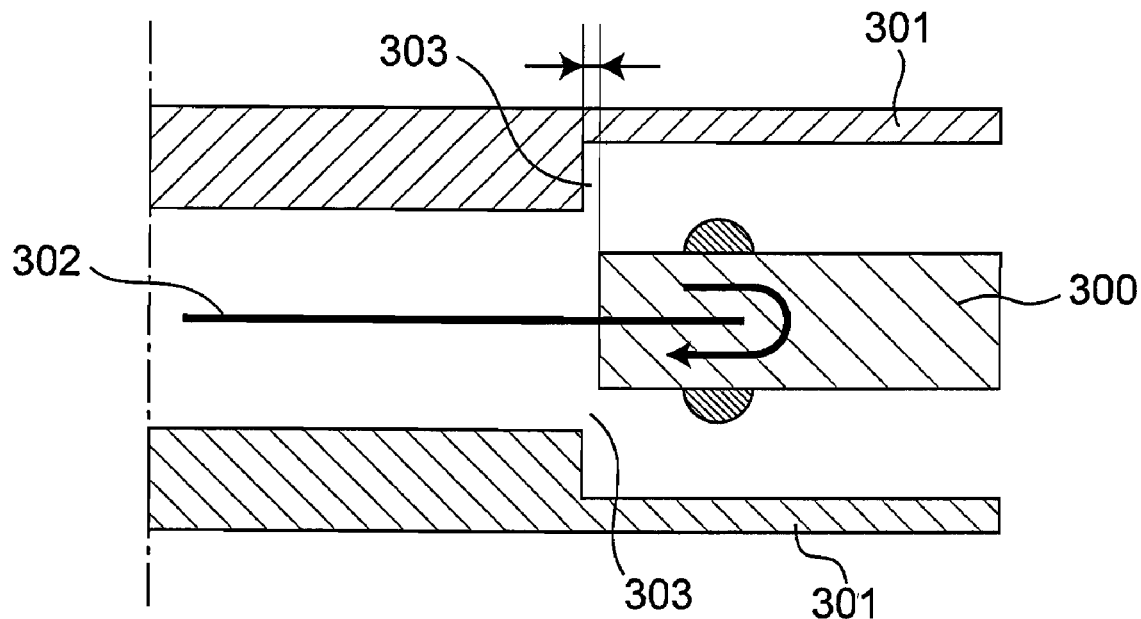
FIG. 12 is an exploded cross-sectional view that shows an electrolyte membrane-electrode assembly of a solid polymer electrolytic fuel cell and a separator in accordance with the prior art.
Figure 13:
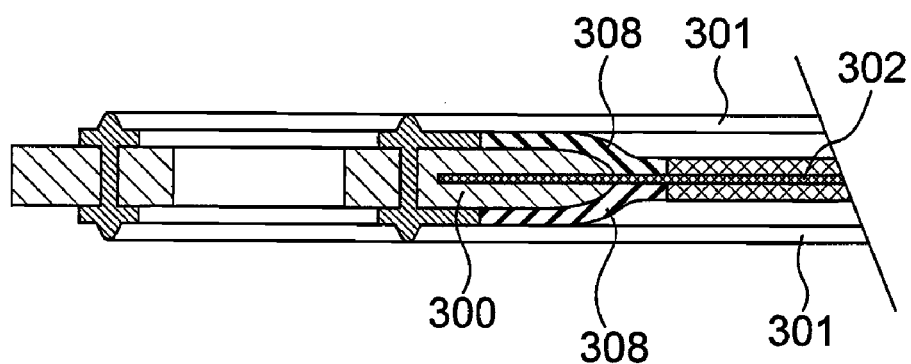
FIG. 13 is a cross-sectional view that shows an electrolyte membrane-electrode assembly of a solid polymer electrolytic fuel cell in accordance with the prior art.

In contrast, as shown in FIG. 11D, in the case when a shift is made between the positions of the elastic member 4b on the anode electrode side and the elastic member 4c on the cathode electrode side, an anode electrode 1b is placed in a mold 61d on the anode electrode side, with a cathode electrode 1c being placed in a mold 61e on the cathode electrode side, and the mold 61d on the anode electrode side and the mold 61e on the cathode electrode side are clamped as shown in FIG. 11E, with a frame member 2 and a polymer electrolyte membrane 1a being sandwiched between the mold 61d on the anode electrode side and the mold 61e on the cathode electrode side. Next, as shown in FIG. 11F, when fused resin is injected into the mold 61d on the anode electrode side and the mold 61e on the cathode electrode side thus clamped, the fused resin is received by the mold 61e placed behind the polymer electrolyte membrane 1a in a cavity 61h of the elastic member 4b, and in a cavity 61i of the elastic member 4c, the fused resin is received by the extended portion 2h of the frame member 2 placed behind the polymer electrolyte membrane 1a and the mold 61d on the anode electrode side. Therefore, the surfaces to receive the resin pressure at the time of the molding process are provided by the mold or the frame member 2 supported by the mold so that the polymer electrolyte membrane 1a is not deformed.

Figure 10A:
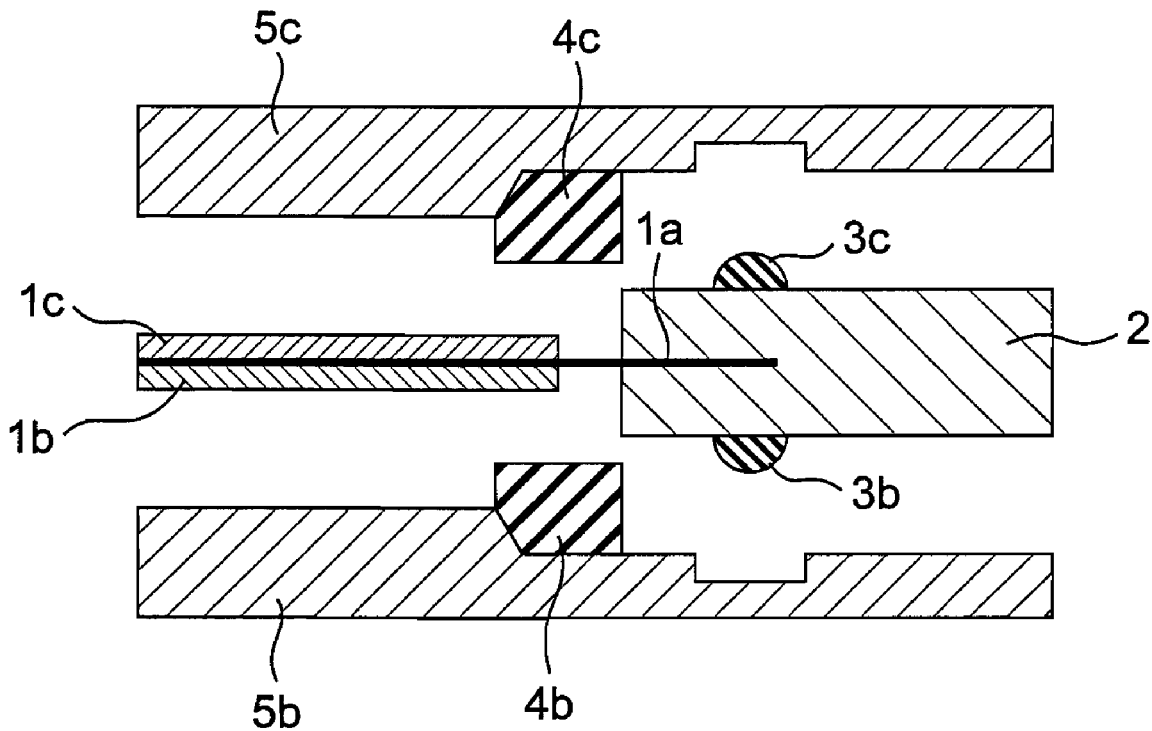
FIG. 10A is a schematic cross-sectional view of a single cell of the stack for a fuel cell prior to an assembling process in accordance with still another modified example of the first or second embodiment.
Figure 10B:
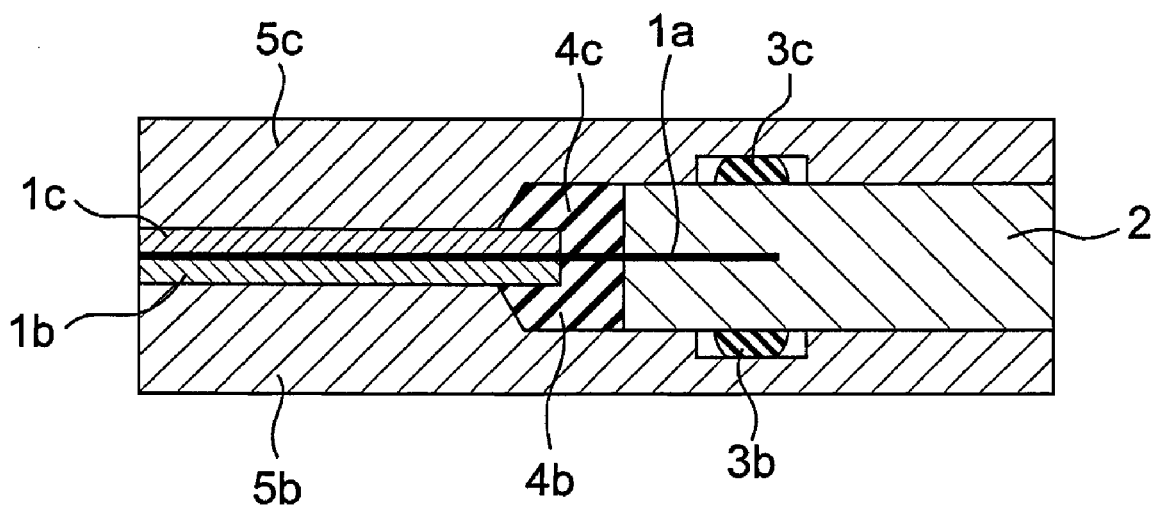
FIG. 10B is a schematic cross-sectional view of a single cell of the stack for a fuel cell after the assembling process in accordance with still another modified example of FIG. 10A.

Here, still another specific example may be proposed in which, in each of the above-mentioned embodiments, as shown in FIGS. 10A and 10B, the elastic members 4b and 4c are placed not on the frame member 2, but on the separators 5b and 5c.

Figure 10C:
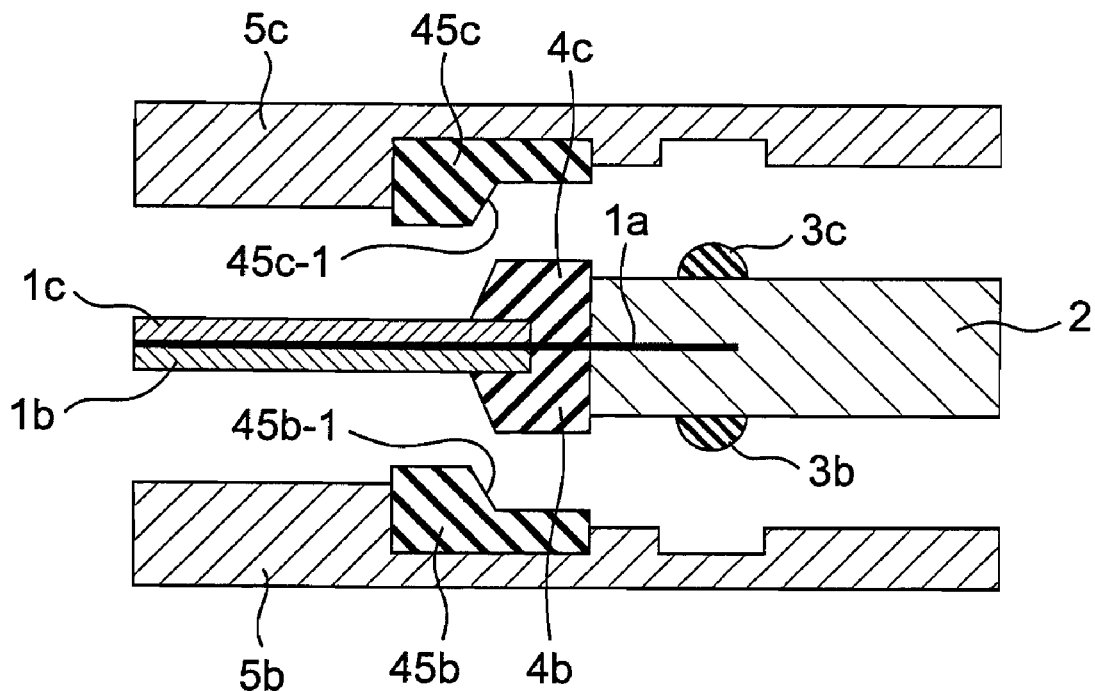
FIG. 10C is a schematic cross-sectional view of a single cell of the stack for a fuel cell prior to an assembling process in accordance with still another modified example of the first or second embodiment.
Figure 10D:
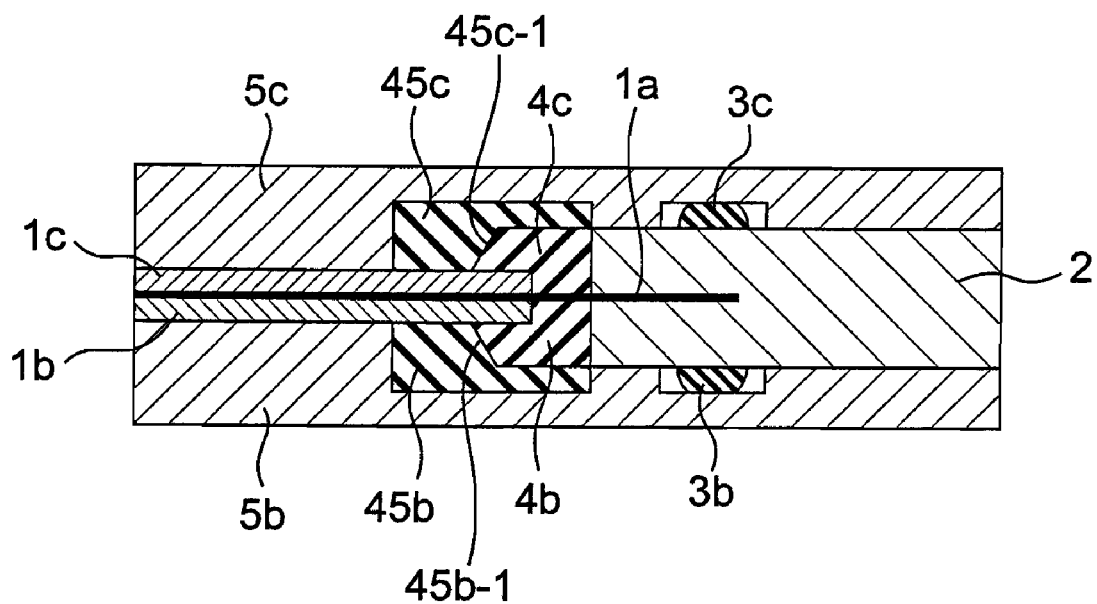
FIG. 10D is a schematic cross-sectional view of a single cell of the stack for a fuel cell after the assembling process in accordance with another modified example of FIG. 10C.

Moreover, still another specific example is proposed in which, in each of the above-mentioned embodiments, the elastic members 4b and 4c are placed in the frame member 2 as shown in FIGS. 10C and 10D, and elastic members 45b and 45c, which are allowed to come into contact with the elastic members 4b and 4c to be placed in press-contact therewith, may also be placed on the separators 5b and 5c. The elastic members 45b and 45c, placed on the separators 5b and 5c, are provided with inclined surfaces 45b-1 and 45c-1 that are the same as the inclined surfaces 5f and 5g of the separators 5b and 5c so that the same functions are exerted.

Example 1

The following description will discuss examples in which a polymer electrolytic fuel cell in accordance with the first embodiment is used.

In FIG. 5A and FIG. 8A, a polymer electrolyte membrane 1a was formed by punching out a resin material, such as "Nafion (registered trademark) N-117 made by Du Pont de Nemours and Company, having a thickness of 50 μm by using a Thompson mold. To each of the surfaces of this polymer electrolyte membrane 1a were joined an anode electrode 1b and a cathode electrode 1c, and by using this polymer electrolyte membrane 1a/electrode assembly 15 as an inserted part, a frame member 2 was resin-molded by using glass-fiber-added polypropylene (for example, R250G, made by Idemitsu Kosan Co., Ltd.).

In the frame member 2 thus formed, as shown in FIG. 8A, at least, respective pairs of manifold holes 15b for fuel gas, manifold holes 15a for oxidizing agent gas and manifold holes 15c for cooling water were formed, and a plurality of through holes 16 used for inserting fastening bolts for cells thereto were also formed.

The frame member 2 was further provided with a gasket 3c, formed on a frame member assembled surface 9 corresponding to the surface with the cathode electrode 1c formed thereon, which includes manifold holes 15a for oxidizing agent gas and oxidizing agent gas flow passages 2y, surrounds the entire area that allows the oxidizing agent gas to pass on the cathode electrode 1c, and also surrounds the manifold holes 15c for cooling water. Moreover, the frame member 2 was also provided with a gasket 3b, formed on a frame member assembled surface 9 corresponding to the surface with the anode electrode 1b formed thereon, which includes manifold holes 15b for fuel gas and fuel gas flow passages 2x, surrounds the entire area that allows the fuel gas to pass on the anode electrode 1b, and also surrounds the manifold holes 15c for cooling water. With respect to a gas flow passage 19 that is directed from each of the manifold hole 15b for fuel gas and the manifold hole 15a for oxidizing agent gas toward each of the electrodes on each of the two surfaces of the anode electrode 1b and the cathode electrode 1c, as shown in FIG. 9, gas flow passage portions 4b-1 and 4c-1 that form portions of the frame-shaped elastic members 4b and 4c, and correspond to the gas flow passage portions 2x and 2y of the frame member 2, are made lower to the same level as the thickness of the frame member 2, and on gas flow passage portions of the separators 5b and 5c that face the gas flow passage portions 4b-1 and 4c-1 of the elastic members 4b and 4c, gas flow passage concave sections 5b-1 and 5c-1 are formed, with reinforcing ribs 4d and 4e being formed in the gas flow passage direction.

In this example, each of the electrodes 1b and 1c had an outer edge of 120 mm in square and a thickness of 0.5 mm, and the frame member 2 had a thickness of 2 mm and an inner edge of 125 mm in square. Moreover, by molding a thermoplastic resin elastomer between the outer edge of the electrode and the inner edge of the frame member, the electrodes 1b and 1c and the frame member 2 were integrally formed. With respect to the elastic members 4b and 4c, a thermoplastic resin elastomer was used, and with an initial thickness of 2.2 mm, the joined surfaces of the elastic members 4b and 4c to the separators 5b and 5c were set to the same surface as that of the frame member 2 by the separators 5b and 5c; thus, the compressed amount of the elastic member at the time of the laminating process was set to 0.10 mm respectively on the anode electrode side as well as on the cathode electrode side.

The inclined surface toward the electrode surface on the inner edge side of each of the elastic members 4b and 4c is formed so as to be inclined by 30 degrees with respect to a direction orthogonal to the polymer electrolyte membrane 1a.

The membrane-electrode-frame assembly 15, thus manufactured, was sandwiched by the anode-side separator 5b and the cathode side separator 5c from the two sides so that a single cell 20 was formed.

Fifty cells of these single cells 20 were laminated, and on each of the ends of the laminated fifty cells, a collector plate 21 made from metal, an insulating plate 22 made from an electric insulating material and an end plate 23 were secured by using a fastening rod; thus, hydrogen and air were supplied thereto, with cooling water being circulated, so that a fuel cell test was carried out. As a result, the gas utilization rate was improved by 6% in comparison with that of the structure without using the elastic members.

By properly combining the arbitrary embodiments of the aforementioned various embodiments, the effects possessed by the embodiments can be produced.

INDUSTRIAL APPLICABILITY

A solid polymer electrolytic fuel cell in accordance with the present invention makes it possible to effectively restrain a cross-leak phenomenon that occurs in the gap between the polymer electrolyte membrane and the frame member, and consequently to further improve the utilization rates of a reducing agent gas and an oxidizing agent gas; thus, the resulting fuel cell is effectively used as a polymer electrolytic fuel cell having further improved performance.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A solid polymer electrolytic fuel cell comprising laminated single cell modules, wherein each of the single cell modules includes:
   a membrane-electrode-frame assembly having an electrode unit and a manifold-forming frame member, the electrode unit being formed of an anode electrode joined onto one surface of a polymer electrolyte membrane and a cathode electrode joined onto the other surface of the polymer electrolyte member, and the manifold-forming frame member being placed on a peripheral edge of the electrode unit;
   a gas supply unit for supplying a fuel gas and an oxidizing agent gas respectively to the anode electrode and the cathode electrode; and
   a pair of separators sandwiching the electrode unit and the membrane-electrode-frame assembly from an anode side and from a cathode side of the membrane-electrode-frame assembly, the separators being configured such that a gap is formed between the membrane-electrode-frame assembly and at least one of the separators,
   wherein an elastic member is placed between an outer edge of the electrode unit and an inner edge of the frame member, and the elastic member is integrally joined to the frame member and has a length equal to or longer than a gap dimension between the membrane-electrodeframe assembly and said at least one of the separators in an assembled state of the single cell modules, wherein the elastic member covers a portion of a surface of at least one of the anode electrode and the cathode electrode, the surface facing one of the separators, and wherein the elastic member is elastically deformed in a thickness direction of the membrane-electrode-frame assembly in the assembled state of the single cell modules, such that the gap is sealed in a tight contact state.

2. The solid polymer electrolytic fuel cell according to claim 1, wherein the elastic member is provided with a plurality of short-cut preventing ribs in contact with said at least one of the separators to be elastically deformed so that, in the assembled state of the single cell modules, the ribs are elastically deformed in a direction orthogonal to the thickness direction of the membrane-electrode-frame assembly.

3. The solid polymer electrolytic fuel cell according to claim 2, wherein a concave section into which elastically deformed portions of the ribs and an elastically deformed portion of the elastic member are released is provided between the ribs so that the elastically deformed portion of the elastic member and the elastically deformed portions of the ribs extend into the concave section.

4. The solid polymer electrolytic fuel cell according to claim 2, wherein a gas supplying space is formed between the elastic member and said at least one separator at a position near the gas supply unit.

5. The solid polymer electrolytic fuel cell according to claim 1, wherein the elastic member is placed only on one of the anode side and the cathode side of the membrane-electrode-frame assembly, and wherein the frame member includes an extended portion which extends toward a center in an inner edge direction so as to receive a compressing pressure of the elastic member upon laminating the separator, the extended portion being disposed on the opposite side of the membrane-electrode-frame assembly from the elastic member.

6. The solid polymer electrolytic fuel cell according to claim 1, wherein the elastic member is placed on each of the anode side and the cathode side of the membrane-electrode-frame assembly, with a position of the elastic member on the anode side being offset from a position of the elastic member on the cathode side.

7. The solid polymer electrolytic fuel cell according to claim 5, wherein the elastic member is placed on each of the anode side and the cathode side of the membrane-electrode-frame assembly, with a position of the elastic member on the anode side being offset from a position of the elastic member on the cathode side.

8. The solid polymer electrolytic fuel cell according to claim 6, wherein a position of an outer edge of the anode electrode joined to one of the surfaces of the polymer electrolyte membrane is offset from a position of an outer edge of the cathode electrode joined to the other surface of the polymer electrolyte membrane.

9. The solid polymer electrolytic fuel cell according to claim 7, wherein a position of an outer edge of the anode electrode joined to one of the surfaces of the polymer electrolyte membrane is offset from a position of an outer edge of the cathode electrode joined to the other surface of the polymer electrolyte membrane.

10. The solid polymer electrolytic fuel cell according to claim 1, further comprising:

a first gasket formed on a surface of the frame member corresponding to the cathode side so as to protrude therefrom, the first gasket including a manifold hole for an oxidizing agent gas and an oxidizing agent gas flow passage, wherein the first gasket surrounds an entire area of the cathode electrode through which the oxidizing agent gas is allowed to pass so that a manifold for an oxidizing gas is formed; and a second gasket formed on a surface the frame member corresponding to the anode side so as to protrude therefrom, the second gasket including a manifold hole for a fuel gas and a fuel gas flow passage, wherein the second gasket surrounds an entire area of the anode electrode through which the fuel gas is allowed to pass so that a manifold for a fuel gas is formed, wherein the first gasket and the second gasket are elastically deformed in the thickness direction of the frame member so that the gap between the frame member and the separator is sealed in a tight contact state.

11. The solid polymer electrolytic fuel cell according to claim 5, further comprising:

a first gasket formed on a surface of the frame member corresponding to the cathode side so as to protrude therefrom, the first gasket including a manifold hole for an oxidizing agent gas and an oxidizing agent gas flow passage, wherein the first gasket surrounds an entire area of the cathode electrode through which the oxidizing agent gas is allowed to pass so that a manifold for an oxidizing gas is formed; and a second gasket formed on a surface the frame member corresponding to the anode side so as to protrude therefrom, the second gasket including a manifold hole for a fuel gas and a fuel gas flow passage, wherein the second gasket surrounds an entire area of the anode electrode through which the fuel gas is allowed to pass so that a manifold for a fuel gas is formed, wherein the first gasket and the second gasket are elastically deformed in the thickness direction of the frame member so that the gap between the frame member and the separator is sealed in a tight contact state.

12. The solid polymer electrolytic fuel cell according to claim 6, further comprising:

a first gasket formed on a surface of the frame member corresponding to the cathode side so as to protrude therefrom, the first gasket including a manifold hole for an oxidizing agent gas and an oxidizing agent gas flow passage, wherein the first gasket surrounds an entire area of the cathode electrode through which the oxidizing agent gas is allowed to pass so that a manifold for an oxidizing gas is formed; and a second gasket formed on a surface the frame member corresponding to the anode side so as to protrude therefrom, the second gasket including a manifold hole for a fuel gas and a fuel gas flow passage, wherein the second gasket surrounds an entire area of the anode electrode through which the fuel gas is allowed to pass so that a manifold for a fuel gas is formed, wherein the first gasket and the second gasket are elastically deformed in the thickness direction of the frame member so that the gap between the frame member and the separator is sealed in a tight contact state.

13. The solid polymer electrolytic fuel cell according to claim 7, further comprising:

a first gasket formed on a surface of the frame member corresponding to the cathode side so as to protrude therefrom, the first gasket including a manifold hole for an oxidizing agent gas and an oxidizing agent gas flow passage, wherein the first gasket surrounds an entire area of the cathode electrode through which the oxidizing agent gas is allowed to pass so that a manifold for an oxidizing gas is formed; and a second gasket formed on a surface the frame member corresponding to the anode side so as to protrude therefrom, the second gasket including a manifold hole for a fuel gas and a fuel gas flow passage, wherein the second gasket surrounds an entire area of the anode electrode through which the fuel gas is allowed to pass so that a manifold for a fuel gas is formed, wherein the first gasket and the second gasket are elastically deformed in the thickness direction of the frame member so that the gap between the frame member and the separator is sealed in a tight contact state.

14. The solid polymer electrolytic fuel cell according to claim 8, further comprising:

a first gasket formed on a surface of the frame member corresponding to the cathode side so as to protrude therefrom, the first gasket including a manifold hole for an oxidizing agent gas and an oxidizing agent gas flow passage, wherein the first gasket surrounds an entire area of the cathode electrode through which the oxidizing agent gas is allowed to pass so that a manifold for an oxidizing gas is formed; and a second gasket formed on a surface the frame member corresponding to the anode side so as to protrude therefrom, the second gasket including a manifold hole for a fuel gas and a fuel gas flow passage, wherein the second gasket surrounds an entire area of the anode electrode through which the fuel gas is allowed to pass so that a manifold for a fuel gas is formed, wherein the first gasket and the second gasket are elastically deformed in the thickness direction of the frame member so that the gap between the frame member and the separator is sealed in a tight contact state.

15. The solid polymer electrolytic fuel cell according to claim 9, further comprising:

a first gasket formed on a surface of the frame member corresponding to the cathode side so as to protrude therefrom, the first gasket including a manifold hole for an oxidizing agent gas and an oxidizing agent gas flow passage, wherein the first gasket surrounds an entire area of the cathode electrode through which the oxidizing agent gas is allowed to pass so that a manifold for an oxidizing gas is formed; and a second gasket formed on a surface the frame member corresponding to the anode side so as to protrude therefrom, the second gasket including a manifold hole for a fuel gas and a fuel gas flow passage, wherein the second gasket surrounds an entire area of the anode electrode through which the fuel gas is allowed to pass so that a manifold for a fuel gas is formed, wherein the first gasket and the second gasket are elastically deformed in the thickness direction of the frame member so that the gap between the frame member and the separator is sealed in a tight contact state.

16. A solid polymer electrolytic fuel cell comprising:

a polymer electrolyte membrane;

a first electrode and a second electrode that sandwich the polymer electrolyte membrane, and have a gas diffusion layer;

a first separator having a flow passage for supplying and discharging a reaction gas to and from the first electrode;

a second separator having a flow passage for supplying and discharging a reaction gas to and from the second electrode; and a frame member that has rectangular opening sections placed on peripheral edge portions of the first electrode and the second electrode, wherein a first elastic member is formed between an outer edge of the first electrode and an inner edge of the frame member on a first electrode side, wherein the first elastic member covers a portion of a surface of the first electrode, the surface facing the first separator, wherein at least one portion of an outer edge of the gas diffusion layer of the first electrode is placed so as to be extended outside an outer edge of the gas diffusion layer of the opposing second electrode, and wherein at least one portion of the outer edge of the gas diffusion layer of the first electrode and at least one portion of an inner edge of the frame member on the second electrode side are arranged facing each other.

17. The solid polymer electrolytic fuel cell according to claim 16, wherein a second elastic member is further placed between the outer edge of the second electrode and the inner edge of the frame member on a first electrode side.

18. The solid polymer electrolytic fuel cell according to claim 16, wherein a second elastic member is further placed between the outer edge of the second electrode and the inner edge of the frame member on a first electrode side, and wherein the second elastic member covers a portion of a surface of the second electrode, the surface facing the second separator.

19. The solid polymer electrolytic fuel cell according to claim 1, wherein the separators are configured such that the gap is formed between the membrane-electrode-frame assembly and both of the separators, wherein the elastic member covers a portion of a surface of the anode electrode, the surface facing one of the separators, wherein the elastic member covers a portion of a surface of the cathode electrode, the surface facing the other of the separators.

20. The solid polymer electrolytic fuel cell according to claim 19, wherein the elastic member is provided with a plurality of short-cut preventing ribs placed in contact with both of the separators to be elastically deformed so that, in the assembled state of the single cell modules, the ribs are elastically deformed in a direction orthogonal to the thickness direction of the membrane-electrode-frame assembly.

* * * * *